(12) United States Patent
Yogeeswaran et al.

(10) Patent No.: US 8,924,604 B2
(45) Date of Patent: Dec. 30, 2014

(54) SYSTEMS AND METHODS FOR DATA COMPRESSION AND FEATURE EXTRACTION FOR THE PURPOSE OF DISAGGREGATING LOADS ON AN ELECTRICAL NETWORK

(75) Inventors: Karthik Yogeeswaran, Santa Monica, CA (US); Yael Maguire, Somerville, MA (US); Charles Gillen-O'Neel, Los Angeles, CA (US); Ameet V. Joshi, Playa Vista, CA (US); Stacy Tantum, Durham, NC (US); Matthew S. Reynolds, Seattle, WA (US); Shwetak N. Patel, Seattle, WA (US)

(73) Assignee: Belkin International, Inc., Playa Vista, CA (US)

( * ) Notice: Subject to any disclaimer, the term of this patent is extended or adjusted under 35 U.S.C. 154(b) by 218 days.

(21) Appl. No.: 13/444,505

(22) Filed: Apr. 11, 2012

(65) Prior Publication Data
US 2013/0080092 A1  Mar. 28, 2013

Related U.S. Application Data

(60) Provisional application No. 61/539,427, filed on Sep. 26, 2011, provisional application No. 61/578,638, filed on Dec. 21, 2011.

(51) Int. Cl.
G06F 5/00 (2006.01)
H04B 3/54 (2006.01)
H02J 3/02 (2006.01)

(52) U.S. Cl.
CPC ... *H02J 3/02* (2013.01); *H04B 3/54* (2013.01); *H04B 2203/5416* (2013.01)
USPC ............... 710/18; 710/5; 710/16; 710/72

(58) Field of Classification Search
None
See application file for complete search history.

(56) References Cited

U.S. PATENT DOCUMENTS

| 4,716,409 A | 12/1987 | Hart et al. |
| 5,229,753 A | 7/1993 | Berg et al. |

(Continued)

FOREIGN PATENT DOCUMENTS

| JP | 2000-258482 | 9/2000 |
| KR | 10-1998-0069423 | 10/1998 |
| KR | 10-2004-0087036 | 10/2004 |

OTHER PUBLICATIONS

Anant Sahai, Cyclostationary Feature Detection, 2005, DySPAN, pp. 1-69.*

(Continued)

*Primary Examiner* — Cheng-Yuan Tseng
(74) *Attorney, Agent, or Firm* — Bryan Cave LLP

(57) ABSTRACT

Some embodiments concern a method of detecting usage of one or more electrical devices coupled to an electrical power line. An electrical power signal with a predetermined period is on the electrical power line. The one or more electrical devices place one or more noise signals on the electrical power line. The electrical power signal comprises the one or more noise signals. The method can include: using a data acquisition device to acquire first data about the electrical power signal on the electrical power line such that the acquiring of the first data is synchronized with the predetermined period of the electrical power signal; processing the first data to create frequency domain data; and applying a feature extraction algorithm to the frequency domain data to determine a transition of an electrical state of at least a first one of the one or more electrical devices. Other embodiments are disclosed.

22 Claims, 17 Drawing Sheets

(56) References Cited

U.S. PATENT DOCUMENTS

| | | |
|---|---|---|
| 5,233,342 A | 8/1993 | Yashiro et al. |
| 5,268,666 A | 12/1993 | Michel et al. |
| 5,428,342 A | 6/1995 | Enoki et al. |
| 5,600,310 A | 2/1997 | Whipple et al. |
| 5,650,771 A | 7/1997 | Lee |
| 5,699,276 A * | 12/1997 | Roos .................. 379/106.03 |
| 5,880,677 A | 3/1999 | Lestician |
| 6,147,484 A | 11/2000 | Smith |
| 6,420,969 B1 | 7/2002 | Campbell |
| 6,906,617 B1 | 6/2005 | Van der Meulen |
| 7,982,596 B2 * | 7/2011 | Curt et al. ................. 340/514 |
| 8,094,034 B2 | 1/2012 | Patel et al. |
| 8,325,817 B2 * | 12/2012 | Iwami et al. ............. 375/240.19 |
| 2003/0112370 A1 * | 6/2003 | Long et al. .................... 348/474 |
| 2006/0049831 A1 | 3/2006 | Anwar et al. |
| 2007/0014369 A1 * | 1/2007 | Santhoff et al. .......... 375/240.27 |
| 2011/0249181 A1 * | 10/2011 | Iwami et al. ................. 348/501 |
| 2013/0179124 A1 * | 7/2013 | Patel et al. .................... 702/190 |

OTHER PUBLICATIONS

Int'l Search Report and Written Opinion for corresponding Int'l Application No. PCT/US12/57224 dated Mar. 8, 2013.

* cited by examiner

200

400

500

700

800

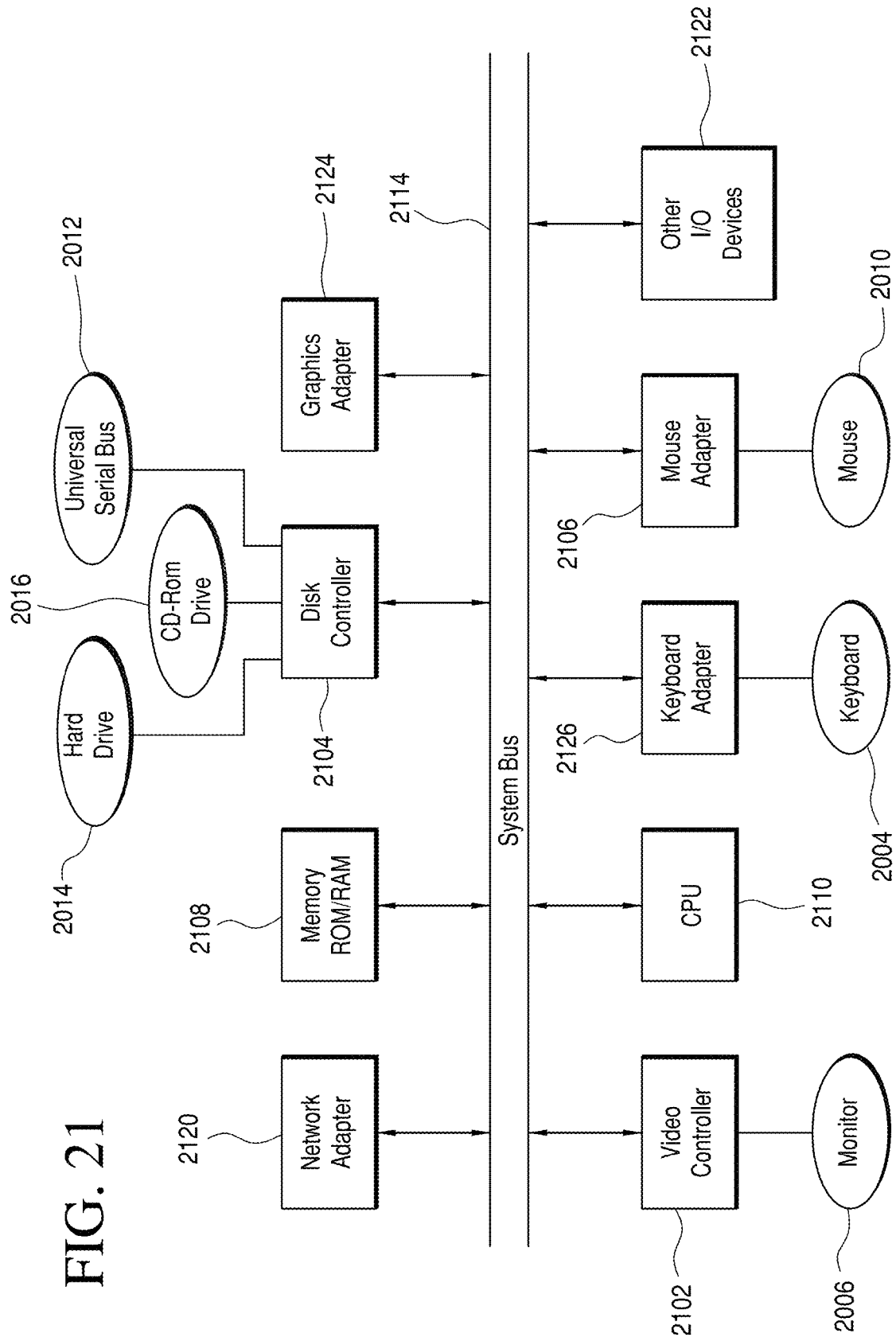

SYSTEMS AND METHODS FOR DATA COMPRESSION AND FEATURE EXTRACTION FOR THE PURPOSE OF DISAGGREGATING LOADS ON AN ELECTRICAL NETWORK

CROSS-REFERENCE TO RELATED APPLICATIONS

This application claims the benefit of U.S. Provisional Application No. 61/539,427, filed Sep. 26, 2011, and U.S. Provisional Application No. 61/578,638, filed Dec. 21, 2011. U.S. Provisional Application Nos. 61/539,427 and 61/578,638 are incorporated herein by reference.

FIELD OF THE INVENTION

This invention relates generally to electrical devices, and relates more particularly to electrical event detection devices and methods of detecting and classifying electrical power usage.

DESCRIPTION OF THE BACKGROUND

Many approaches for detecting and classifying electrical appliance activation use a distributed model wherein each electrical device has a dedicated sensor, which looks for changes in the device's state (e.g., the turning-on and turning-off of the device). Device level sensing is conceptually straightforward, but requires time-consuming and expensive installation and maintenance. Indirect sensing techniques have also been used where microphones, accelerometers, and video cameras are placed throughout a structure to detect electrical appliance activity. Such techniques are effective, but require costly installation and maintenance and may also raise privacy concerns in a home setting. For example, one technique for electrical event detection involves indirectly listening to the activation of switches and motors through microphones distributed throughout a living space.

Accordingly, a need or potential for benefit exists for an apparatus or method that can provide detailed information about the electrical state of electrical devices in a home or other structure but also is relatively inexpensive to deploy and does not require professional installation.

BRIEF DESCRIPTION OF THE DRAWINGS

To facilitate further description of the embodiments, the following drawings are provided in which:

FIG. 21 illustrates a representative block diagram of an example of the elements included in the circuit boards inside chassis of the computer of FIG. 20.

Figure 1:
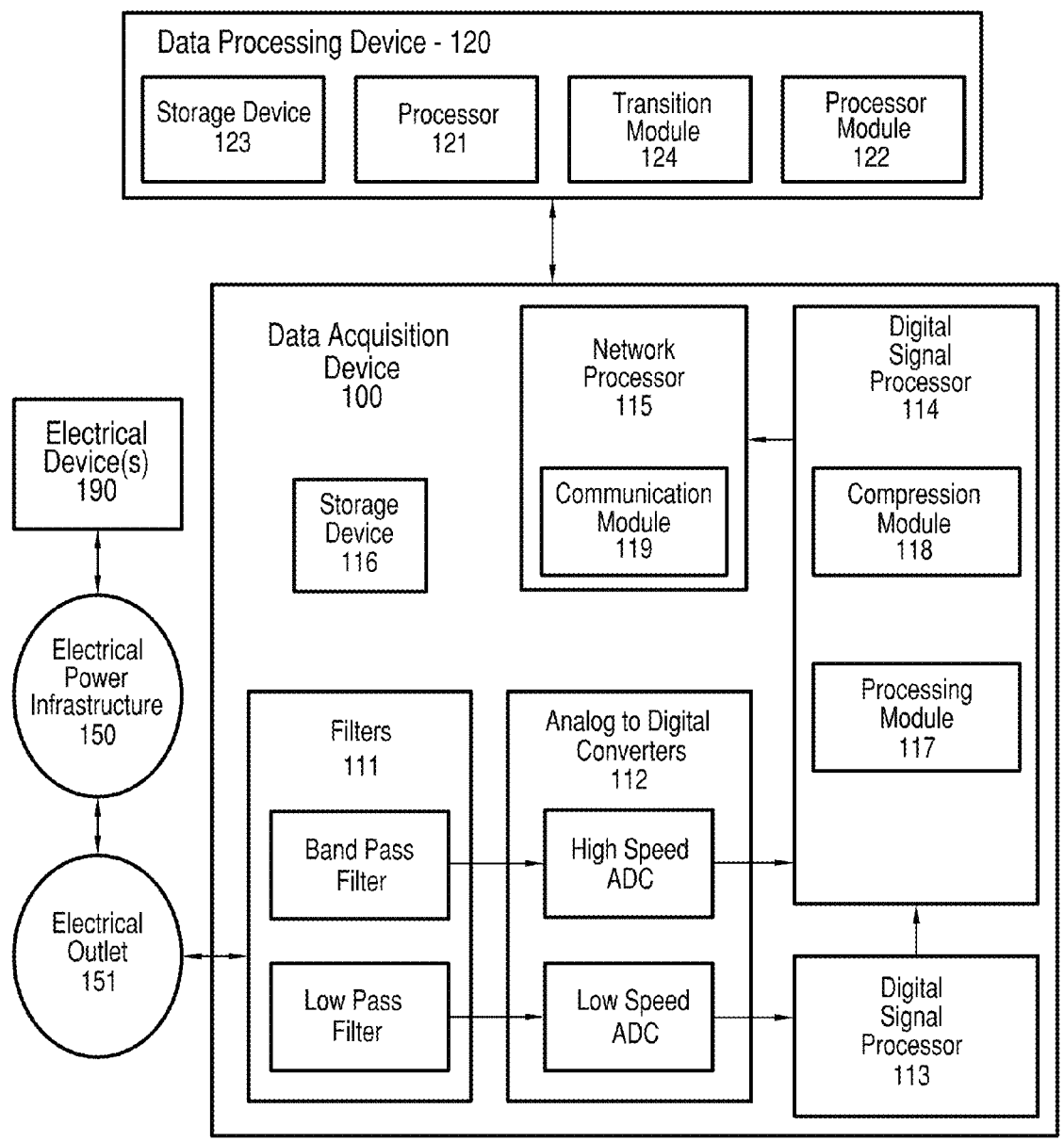
FIG. 1 illustrates a diagram of an exemplary electrical event detection system 100, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments concern a method of detecting usage of one or more electrical devices coupled to an electrical power line. An electrical power signal with a predetermined period is on the electrical power line. The one or more electrical devices place one or more noise signals on the electrical power line. The electrical power signal comprises the one or more noise signals. The method can include: using a data acquisition device to acquire first data about the electrical power signal on the electrical power line such that the acquiring of the first data is synchronized with the predetermined period of the electrical power signal; processing the first data to create frequency domain data; and applying a feature extraction algorithm to the frequency domain data to determine a transition of an electrical state of at least a first one of the one or more electrical devices.

In some examples, the method can include using the transition of the electrical state of at least the first one of the one or more electrical devices to determine an electrical power usage by at least the first one of the one or more electrical devices. In various examples, the method can include using the frequency domain data to determine an electrical power usage by at least the first one of the one or more electrical devices.

In some embodiments, using the data acquisition device to acquire the first data can include determining a zero crossing and the predetermined period of the electrical power signal; and using a data acquisition device to sample the electrical power signal at a predetermined delay from the zero crossing to create two or more cyclostationary signals; and the first data comprise the two or more cyclostationary signals. In various embodiments, the first data is cyclostationary with respect to the electrical power signal.

In many embodiments, using a data acquisition device to acquire the first data can include determining when a zero crossing of the electrical power signal occurs; determining the predetermined period of the electrical power signal; using a timer of the data acquisition device to determine a time when to sample the electrical power signal such that the electrical power signal is sampled at a maximum and a minimum of an amplitude of the electrical power signal; and sampling the electrical power signal using the data acquisition device.

In some embodiments, processing the first data to create the frequency domain data can include using a first processor to process the first data to create the frequency domain data. In the same or different example, applying the feature extraction algorithm can include: using the first processor to apply the feature extraction algorithm to the frequency domain data to determine the transition of the electrical state of at least the first one of the one, or more electrical devices; and the data acquisition device comprises the first processor.

In some examples, the method can include before applying the feature extraction algorithm, using the data acquisition device to apply a first compression algorithm to the frequency domain data to create compressed frequency domain data; transmitting the compressed frequency domain data from the data acquisition device to a data processing device; and using the data processing device to apply a first decompression algorithm to the compressed frequency to decompress the frequency domain data.

In some embodiments, processing the first data to create the frequency domain data can include: using a first processor to process the first data to create the frequency domain data and applying the feature extraction algorithm can include using a second processor to apply the feature extraction algorithm to the frequency domain data to determine the transition of the electrical state of at least the first one of the one or more electrical devices. The data acquisition device comprises the first processor and the data processing device comprises the second processor.

In many embodiments, applying the feature extraction algorithm can include using the frequency domain data to identify one or more high frequency signatures in the electrical power signal; determining which of the one or more electrical devices has each of the one or more high frequency signatures wherein the one or more noise signals comprise the one or more high frequency signatures.

In the same or different embodiments, using the frequency domain data to identify one or more high frequency signatures can include: separating the frequency domain data into a steady-state frequency domain data and transient frequency domain data; identifying one or more high frequency steady-state signatures in the steady-state frequency domain data; identifying one or more high frequency transient signatures in the transient frequency domain data; combining the one or more high frequency transient signatures and the one or more high frequency steady-state signatures into the one or more high frequency signatures. In some embodiments, the predetermined period of the electrical power signal is sixty Hertz in the United Sates (fifty Hertz in Japan and Europe).

Various embodiments teach a method of compressing one or more first data signals. The method can include using one or more first processors to determine a zero crossing of the one or more first data signals; using the one or more first processors to determine a period of the one or more first data signals; sampling the one or more first data signals at a predetermined delay from the zero crossing of the one or more first data signals to create two or more cyclostationary signals, the two or more cyclostationary signals are cyclostationary with the one or more first data signals; using the one or more first processors to convert the two or more cyclostationary signals into frequency domain data; and using one or more first processors to apply a first compression algorithm to the frequency domain data to create compressed frequency domain data.

In some embodiments, using the one or more first processors to convert the two or more cyclostationary signals can include performing a fast Fourier transform to the two or more cyclostationary signals to create two or more traces. In some examples, the method can include after using the one or more first processors to apply the first compression algorithm, transmitting the compressed frequency domain data from a first electrical device to a second electrical device; and using the second electrical device to apply a first decompression algorithm to compressed frequency domain data to decompress the frequency domain data wherein: the first electrical device comprises the one or more first processors. In some embodiments, the first compression algorithm comprises JPEG 2000 compression algorithm.

Various other embodiments teach an apparatus configured to detect a change in an electrical state of one or more electrical devices. The one or more electrical devices are coupled to an electrical power infrastructure and generate electrical noise on the electrical power infrastructure. The apparatus can include: a data acquisition device comprising at least one first processor and configured to acquire first data about the electrical power signal on the electrical power line such that the acquiring of the first data is synchronized with the predetermined period of the electrical power signal; a processing module configured to run on at least one first processors of data acquisition device and configured to use the first data to create frequency domain data; and a feature extraction module configured to run on the at least one first processors of the data acquisition device and further configured to apply a feature extraction algorithm to the frequency domain data to determine a transition of an electrical state of at least a first one of the one or more electrical devices.

In some examples, the apparatus can include a transition module configured to run on at least one of the at least one first processor of the data acquisition device or a second processor. The transition module further configured to using the transition of the electrical state of at least the first one of the one or more electrical devices to determine an electrical power usage by at least the first one of the one or more electrical devices. The second processor is part of a data processing device.

In some examples, the apparatus can include a transition module configured to run on at least one of the at least one first processor of the data acquisition device or a second processor. The transition module further configured to using the frequency domain data to determine an electrical power usage by at least the first one of the one or more electrical devices and the second processor is part of a data processing device.

In some examples, the apparatus can include a compression module configured to run on the at least one first processor of the data acquisition device and further configured to apply a first compression algorithm to the frequency domain data to create compressed frequency domain data; a communications module configured to transmit the compressed frequency domain data to a data processing device; and a remote data processing module configured to run on a second processor and further configured to apply a first decompression algorithm to compressed frequency to decompress the frequency domain data. Some embodiments teach a method of feature extraction that can serve the dual purpose of compressing the data for transmission and extracting the pertinent information for use as features. Various embodiments described herein can be a method to acquire high frequency data in a cyclostationary form to simplify data compression and processing.

Embodiments described herein can also provide: methods to capturing and processing the continuous noise from switching power supplies by providing a method to separate signals from the switching supplies from non load interference sources (radio, PLC (power line communications, etc); methods to separate the frequency changes induced by variable frequency loads from 'events' (device actuation); methods to reduce data throughput by greater than 670× (or 800×); methods to track the trajectory of a switching supply peak as it varies in frequency; and/or methods to determine which peak in a spectrogram is associated with a particular change (or set of changes) in power usage.

Electrical power on electrical power lines can include electrical noise. The electrical noise present on an electrical power line can be caused by the operation of an electrical device, which is electrically coupled to the electrical power line. This type of electrical noise is called conducted electromagnetic interference (EMI). EMI can be classified into two types: transient noise and continuous noise. In some embodiments, continuous or transient electrical noise that occurs when an electrical device is turned-on is not the same shape of the electrical noise after a few alternating current electrical cycles (e.g., one alternating current electrical cycle is 1/60th of a second in the United States). For example, the electrical noise of a compact fluorescent light bulb (CFL) has one shape for a few alternating current electrical cycles while the CFL is warming up and then the shape of the electrical noises changes to a second shape after the CFL is warmed-up. In another example, DC (direct current) motors have a continuous noise but the continuous noise of the DC motor can only lasts microseconds but can repeat every alternating current electrical cycle while the DC motor is running. The electrical event detection device described below can detect all of these types of electrical noise.

Transient noise is characterized by the short duration for which it can be observed, generally tens of nanoseconds to a few milliseconds. Substantially continuous noise, on the other hand, can be observed for as long as the electrical device is operational in some examples. In many embodiments, "continuous noise," as used herein, can mean repetitive, continual, uninterrupted, or repeated noise. In the same or different embodiments, noise can be continuous if a pattern in the noise is repeated every alternating current cycle (or if an electrical noise signal is observed without cessation while the electrical device is in operation). Noise can be still considered continuous noise if a one alternating current cycle break occurs in the noise.

In many examples, continuous electrical noise can be identifiable on the electrical power line for a length of time greater than one alternating current electrical cycle. In another example, continuous electrical noise can be identifiable for a length of time that is less than one alternating current cycle but the electrical signals are repeated in three or more alternating current electrical cycles. In another example, continuous electrical noise can be electrical signals that are identifiable on the electrical power line for a length of time greater than approximately fifty milliseconds. In still other examples, continuous electrical noise can be electrical signals that are identifiable on the electrical power line for a length of time greater than approximately one second.

Both transient and continuous noise can either be concentrated within a narrow frequency band or spread over a wider bandwidth (i.e., broadband noise). A CFL is an example of an electrical device that generates continuous noise, which is conducted over the electrical power line due to its electrical coupling with the electrical power line infrastructure. Because a structure's electrical distribution system is interconnected in parallel at the structure's circuit breaker panel, conducted EMI propagates widely from a given electrical device throughout the electrical line infrastructure of the structure.

Continuous noise is usually intrinsic to an electrical device's operation and internal electronics. Appliances like a grinder emit electrical noise synchronous to the frequency of AC (alternating current) power (60 Hz in the USA) and its harmonics (120 Hz, 180 Hz, etc.) due to the continuous making and breaking of electrical contact by motor brushes of this type of electrical device.

A switched-mode power supply (SMPS) is an electrical power supply unit that incorporates a switching regulator to provide the output voltage required by electrical devices. The function of the SMPS is to provide a regulated output voltage usually at a different level from the input voltage received from the electrical power infrastructure. Electrical devices using SMPS have become increasingly prevalent because of their higher efficiency, smaller size, and lower cost compared to traditional power supplies. Additionally, manufacturers increasingly employ SMPS in their products to meet minimum energy efficiency requirements (e.g., the United States Department of Energy's Energy Star program). For example, most personal computers as well as fluorescent lighting now use SMPS. More than ten years ago, most consumer electronic devices did not employ SMPS because of the immature state of SMPS technology and the absence of low cost, single chip SMPS implementations.

Modern SMPS-based electrical devices generate noise that is synchronous to their power supply's internal oscillator. Additionally, in contrast to traditional linear power regulators, an SMPS does not dissipate excess power as heat, but instead stores energy in an inductor and switches this stored energy in from the electrical power line and out to the load as required, and thus wasting much less energy than traditional electrical power supplies. The key to an SMPS smaller size and efficiency is its use of a power transistor to switch the stored electrical energy at a high frequency, also known as the switching frequency. The switching frequency is usually much higher than the 60 Hz AC line frequency (in the U.S.) because, at higher frequencies, the inductors or transformers required are much smaller than those utilized for 60 Hz AC to DC conversion. A typical SMPS operates at tens to hundreds of kilohertz (kHz). The switching waveform can be adjusted to match the power requirements of the electrical device that the SMPS is powering. For example, a CFL's power supply employs an SMPS to generate the high voltages necessary to power the CFL. The switching action, which is the cornerstone of an SMPS's operating principle, generates a large amount of EMI centered around the switching frequency.

Moreover, most modern consumer electronic appliances are moving towards using a "soft switch" instead of a mechanical switch. Unlike a mechanical switch, a soft switch uses a software driven push button that electronically cycles the electrical power to the electrical device. In this type of switch, the indirect activation of the electrical device by a software-driven electronic switch minimizes the transient noise generated at the moment of activation. It has been observed that several devices, such as LCD (liquid crystal display) monitors and DVD players, which use soft switches, did not generate any detectable transient noise. Software driven devices, such as LCD monitors and DVD plays, are nearly always SMPS-based, and thus, electrical event detection device 110 (FIG. 1) can detect their change in power state by monitoring the EMI produced by the electrical devices.

Like modern SMPS-based electrical devices, dimmers also produce continuous noise due to the triggering of at least one internal triac switch. This continuous noise can be used to detect and identify incandescent loads the dimmer controls. In contrast to the narrowband noise produced by SMPS, a dimmer produces broadband noise spanning hundreds of kilohertz, which can be modeled as a Gaussian distribution having a large variance.

Moreover, in the United States, the Federal Communications Commission (FCC) has set rules (e.g., 47 C.F.R. part 15/18: Consumer Emission Limits) for any electrical device that couples to the electrical power line infrastructure that dictate the maximum amount of EMI an electrical device can conduct back onto the electrical power line infrastructure. The FCC limit is currently 66 dBuV (decibel ratio of volts to one microvolt) for a frequency range between 150 kHz to 500 kHz, which is nearly −40 dBm (decibel ratio of watts to one milliwatt) across a 50 ohm load.

Transient based disaggregation techniques can utilize the high-energy broadband transients caused by the sudden change in current at the instant a load is added or removed from the electrical network. The high frequency spectrum (e.g., 10 kHz (kilohertz) to 5 MHz (megahertz)) of the transient is computed and is used as a feature for disaggregation. Using the spectrum of the broadband transient as a feature for disaggregation is complicated by the fact that the majority of loads produce broadband transients during every AC (alternating current) cycle making it difficult to isolate the transient induced by the device turn on/off from the repeating transients that occur in every AC cycle. Another complicating matter to the utilization of the spectra of the broadband transient is that the point during the AC cycle in which the device is actuated is random and as the line impedance varies across the AC cycle, the shape of the spectrum seen from the transient varies.

Continuous noise based disaggregation techniques can focus on switch mode power supply (SMPS) based loads and utilizes the changes in the high frequency spectrum (e.g., 10 kHz to 500 kHz) due to the addition or removal of high frequency artifacts, which can occur in every cycle (i.e., continuous noise). Triac loads and other loads can produce very large broadband transients multiple times during each AC cycle as they abruptly turn on/off at a preset voltage. These transients can be 20-50 dB (decibels) larger than the signals of interest from the switching supplies. To combat this (and the variation of the spectrum during the AC cycle), the spectrum can be averaged heavily and subtracted from an average taken at a later moment. This difference spectrum method relies on distinct changes in the spectra during their state change (on/off/idle/etc). Devices that have complex Power On Startup Transients (POSTs) complicate the detection of the startup event. In some examples, a Gaussian fit can be applied to the highest amplitude in this difference spectrum. The center frequency, amplitude, and bandwidth of the fit can be stored as a feature and these features can be compared using a KNN (k-nearest neighbor) classifier in one embodiment. A further complication is that some devices can change their switching frequency over time depending on load current. This change complicates the method of using a difference vector because innumerable false positives can occur detector and flood the machine learning algorithm with multiple features for a given device. U.S. application Ser. No. 12/283,869 to Patel et al. and PCT Application No. PCT/US11/33992 to Patel et al., which describe transient and continuous noise detection systems, are incorporated herein by reference.

Another complication to the spectrum approach is that the difference vector seen varies depending on the other loads on the line. This occurs because as the line impedance changes when new loads are added and certain harmonics from a prior actuated load are muted so a device off actuation might not have an identical feature to its on actuation.

In some examples, load elements within household devices or appliances can be coarsely categorized into the following four categories: (a) resistive; (b) inductive; (c) triac; (d) switching (AC/DC (direct current) and DC/DC) and linear power supply. Switching load elements can include variable frequency switching supplies and variable pulse width switching supplies. In some examples, a device or appliance can include one of more of the different types of load elements.

Resistive type elements can have the following characteristics: (a) power elements: resistive loads have a unity power factor (i.e., real power equal to apparent power); (b) load current harmonics: the harmonic content of the current waveform will be identical to that of the voltage waveform; (c) high frequency transients: a high frequency transient will be produced if the device is actuated as long as the device is not actuated at the zero crossing; and (d) high frequency continuous (non broadband): none.

Inductive type elements can have the following characteristics: (a) power: inductive loads have a non-unity power factor (i.e., real power less than apparent power); (b) load current harmonics: the harmonic content of the current waveform will be identical to that of the voltage waveform; (c) high frequency transients: a high frequency transient will be produced if the device is actuated as long as the device is not actuated at the zero crossing; and (d) high frequency continuous (e.g., non broadband): none.

Triac type elements can have the following characteristics: (a) power: triac loads have a non-unity power factor (e.g., real power less than apparent power); (b) load current harmonics: triac loads produce a significant number of low frequency current harmonics; (c) high frequency transients: traics produce two transients exactly 1 half wave apart every AC cycle); and (d) high frequency continuous (i.e., non broadband): none.

Switching type elements have the following characteristics: (a) power: switching loads have a non-unity power factor (real power less than apparent power); (b) load current harmonics: switching supplies produce a variable number of low frequency current harmonics depending on the power factor correction implemented in the circuit; (c) high frequency transients: A comparatively smaller high frequency transient will be produced four times per AC cycle. The turn on/off transients will be exactly one half cycle apart; (d) high frequency continuous (non broadband): two types: (1) variable frequency switchers: the center frequency of the switcher will vary from AC cycle to AC cycle as the load current changes. These peaks are narrowband signals. Averaging distorts the peaks to form non Gaussian shapes; and (2) fixed frequency switchers: The center frequency remains constant (can vary with device temperature). The on time duration is varied with the load current.

Residential and small commercial electrical service is typically 240 volt split phase service. This refers to the utility providing two 120 V alternating current (AC) source conductors (e.g., power conductors) that are 180 degrees out of phase, along with a neutral conductor (e.g., power conductor) that can be used to return current from either power conductor. Power conductors are the "feeder" or "main" electrical power conductors that carry the incoming power from the utility before being split up into branch circuits that serve different loads. By sensing the magnetic fields generated by power conductors, system 100 can sense the total current drawn by all loads from the utility because all loads in the structure are coupled in parallel to power conductors.

In the United States, many different types of electrical loads are found in a building served by a 240 V split phase utility service. The electrical loads can be divided into two categories of loads: (a) 120 V loads; and (b) 240 V loads.

The 120 V loads can primarily include lower-wattage loads, i.e., loads plugged into standard 3-prong 120 V 15 A or 120 V 20 A outlets, and small appliances with less than ~2 kW (kilowatt) power draw. These loads are wired in individual circuits between power conductors (the "first phase branch" or the of the wiring circuit) or power conductors pair (the "second phase branch" of the wiring circuit). When wiring a structure, electricians attempt to balance the anticipated wattage of loads and outlets on each leg, but this is not an exact process so current in the different legs are likely to be unbalanced because a different total wattage is typically drawn from each pair. When a 120 V load is turned on, its current flows from the utility, through the power conductor through the main and circuit level circuit breakers, to the load, and then back to the power conductor and back to the utility.

The 240 V loads are typically large appliances (e.g., electric dryer, stove, air conditioner compressor, electric baseboard heaters) that consume more than two kW (kilowatts). In this case, the load current flows between the hot power conductors and no load current flows in neutral power conductor. Because of the 180 degree phase relationship between the voltages on the two hot power conductors, the total voltage is 240 V.

In some examples, implementations of system 100 can include: (1) a current sensor for first phase/branch (4 ksPS (kilo samples per second)); (2) a current sensor for second phase/branch (4 ksPS); (3) Voltage Sensor for first phase/branch (4 ksPS); (4) Voltage Sensor for second phase/branch (4 ksPS); and (5) Voltage Sensor for high frequency signals (2MSPS (mega samples per second)).

Each sensor data point can be represented by a 16 bit integer. The total data capture rate of the five sensors equals 4*8 kB/s (kilobytes per second)+1*4 MB/s (mega bytes per second) equals 4.032 MB/s. Typical household bandwidth available for use by the system described herein is much less than this (approximately 6.25 kB/s). Therefore, the data must be reduced by approximately 670× in a data acquisition device before transmission to data processing device.

Now turning to the drawings, FIG. 1 illustrates a diagram of an exemplary electrical event detection system 100, according to a first embodiment. In some embodiments, electrical event detection system 100 can be configured to detect an electrical state of one or more electrical devices 190. Electrical event detection system 100 can also be configured to detect one or more electrical events in an electrical power line infrastructure 150 of a structure. In many examples, electrical event detection system 100 can use noise placed on electrical power line infrastructure 150 by electrical devices 190 to detect the electrical state of electrical devices 190 or to detect electrical events on electrical power line infrastructure 150. Electrical event detection system 100 is merely exemplary and is not limited to the embodiments presented herein. Electrical event detection system 100 can be employed in many different embodiments or examples not specifically depicted or described herein.

In some examples, electrical devices 190 generate noise electrical signals (e.g., one or more high-frequency electrical signals). In various embodiments, the high-frequency electrical signals (e.g., electrical signals in the tens of kilohertz to a few megahertz range) can be generated by one or more SMPS or other electrical components (e.g., internal triac switches or internal oscillators (other than the SMPS)) of electrical devices 190. In the same or different examples, the electrical power signals on electrical power line infrastructure 150 can be cyclostationary.

In some examples, the one or more electrical events detected by electrical event detection device 100 can include actuation and deactuation (i.e., turning on and turning off) of electrical devices 190 coupled to electrical power line infrastructure 150. The one or more electrical events can also be events where the amount of electrical power provided by an electrical device's electrical power supply to the rest of the electrical device (e.g., turning a dimmer switch) is varied or limited. As used herein, each of electrical devices 190 can have one of three power states: (a) an on-power state; (b) a standby power state; or (c) a complete off-power state. The on-power state includes all electrical power states when an electrical device is powered on and when the electrical power usage of the electrical device is more than nominal (i.e., it is not in a standby or off-power state).

The standby power state is an electrical state where the electrical device is nominally off, but is still drawing electrical power for one or more functions of the electrical devices. That is, electrical devices in the standby power state are nominally turned off, but still draw electrical power for one or more default, continuing, or constant functions. For example, after a user turns off a video cassette recorder (VCR) or an digital video recorder (DVR), the VCR and DVR can continue to draw electrical power from electrical power line infrastructure 150 to light one or more displays on the device (e.g., a clock or one or more LEDs (light emitting diodes)) and/or perform one or more internal functions. In this case, although the user believes the VCR or DVR is off, the VCR or DVR is actually in a standby power state. In another example, after a user turns off an electrical device, the electrical device can continue to draw electrical power to charge an internal battery and, thus, is in a standby power state.

A complete off-power state is a power state where an electrical device is not drawing any electrical power (i.e., truly zero electrical power) from electrical power line infrastructure 150. In the case of the VCR or DVR that draws electrical power even after a user turns off the electrical device, the VCR or DVR can be placed in a complete off state by unplugging the electrical device from electrical power line infrastructure 150 or plugging the VCR or DVR into an electrical switch that completely stops the VCR or DVD from drawing electrical power.

As used herein, "turning on" and similar phrases refer to moving an electrical device to an on-power state from either a completely off-power state or a standby power state. Similarly, as used herein, "turning off" and similar phrases refer to moving an electrical device from an on-power state to either a complete off-power state or a standby power state. Furthermore, a "power-off state" and similar phrases refer to either a complete power off state or a standby power state. A "power-on state" and similar phrases refer to an on-power state.

In some examples, as will be discussed below in regards to dimmers and televisions, electrical event detection device 100 can also detect intermediate states of electrical devices 190. That is, electrical event detection device 100 can detect different on-power state of electrical devices 190.

Referring back to FIG. 1, electrical event detection system 100 can include: (a) at least one data acquisition device 110 configured to be coupled to at least one electrical outlet 151 of electrical power line infrastructure 150 (i.e., the electrical power lines in the structure); and (b) at least data processing device 120. In some embodiment, electrical event detection device 100 does not include electrical power line infrastructure 150, electrical outlet 151, or electrical devices 190. In a different embodiment, electrical event detection device 100 also does not include data processing device 120. In some examples, electrical detection device 100 includes processing module 122 (FIG. 2) but not data processing device 120.

In various embodiments, data acquisition device 110 can include: (a) one or more filters 111; (b) an analog to digital converter 112; (c) a digital signal processor 113; (d) a signal processor 114; (e) a network processor 115; and (f) a storage device 116. Data processing device 120 can include: (a) at least one processor 121; (b) at least one processor module 122; (c) a storage device 123; and (d) a transition module 124.

In some examples, filters 111 can include a high pass and a low pass filter. In some examples, the high pass filter can be configured to pass electrical signals in the range of 10 kHz to 1 MHz. The low pass filer can be configured, e.g., to pass electrical signals in the range of zero Hertz to 1 kHz. Filter 11 can pass one or more filtered electrical signals to analog to digital converter 112. Analog to digital converter 112 can be configured to convert the filtered electrical signals into digital signals.

The high frequency signals (ones to extract noise signatures from) is 10 kHz to 1 MHz this is sampled with ADC and fed into a texas instruments C6748 digital signal processor. The low pass filtered signal of zero hertz to 1 kHz is to measure power and the zero cross signal and this is sampled with a low speed ADC and fed into a Texas Instruments' msp430AFE253 chip.

In some examples, digital signal process 113 can be configured to receive the digitized low pass filtered signal from analog to digital converter 112. Digital signal processor 113 can also be configured determine the zero crossing point of the electrical signal and calculate an electrical power of one or more signals on the electrical power infrastructure 150. Digital signal processor 113 can be configured to communicate the zero crossing and power to signal processor 114.

Signal processor 114 can be configured to receive the digitized high pass filtered signal from analog to digital converter 112. In one example, signal processor 114 can be a TI C6748 processor, manufactured by Texas Instruments, Inc. of Dallas, Tex.

Network processor 115 can receive information and/or data from signal processor 114 can communicate the information and/or data to data processing device 120 via one or more data networks (e.g., the Internet).

Processor module 122 can be configured to run on processor 121. Furthermore, processor module 122 can be configured to apply a feature extraction algorithm to the frequency domain data. Processor module 122 can be further configured use the frequency domain data to determine an electrical power usage by at least the first one of the one or more electrical devices.

"Data processing device 100," as used herein, can refer to a single computer, single server, or a cluster or collection of servers. Typically, a cluster or collection of servers can be used when the demands by client computers (e.g., one or more data acquisition devices) are beyond the reasonable capability of a single server or computer. In many embodiments, the servers in the cluster or collection of servers are interchangeable from the perspective of the client computers.

In some examples, data acquisition system 100 can also include (a) a processing module 117 configured to run on at least one of digital signal processor 113, signal processor 114 or processor 121 and configured to use the data from analog to digital converter 112 to create frequency domain data; (b) a compression module 118 configured to run on at least one of digital signal processor 113, signal processor 114 or network processor 115 and further configured to apply a first compression algorithm to the frequency domain data to create compressed frequency domain data; (c) a communications module 119 configured to run on at least one of digital signal processor 113, signal processor 114 or network processor 115 and configured to transmit the compressed frequency domain data to data processing device 120; and (d) processing module 122 configured to run on processor 121 and further configured to apply a first decompression algorithm to compressed frequency to decompress the frequency domain data.

Furthermore, processor module 122 can be configured to apply a feature extraction algorithm to the frequency domain data. Processor module 122 can be further configured use the frequency domain data to determine an electrical power usage by at least the first one of the one or more electrical devices. That is, processor module can be considered a feature extraction module and a transition module configured to using the transition of the electrical state of electrical devices 190 to determine an electrical power usage by electrical devices 190. In other embodiments, the feature extraction module and transition module can run on one of digital signal processor 113 or signal process 114.

Transition module 124 can be configured to run on at processor 121 or digital signal processor 113. Transition module 124 can be further configured to use the transition of the electrical state of at least the first one of the one or more electrical devices to determine an electrical power usage by at least the first one of the one or more electrical devices.

Figure 2:
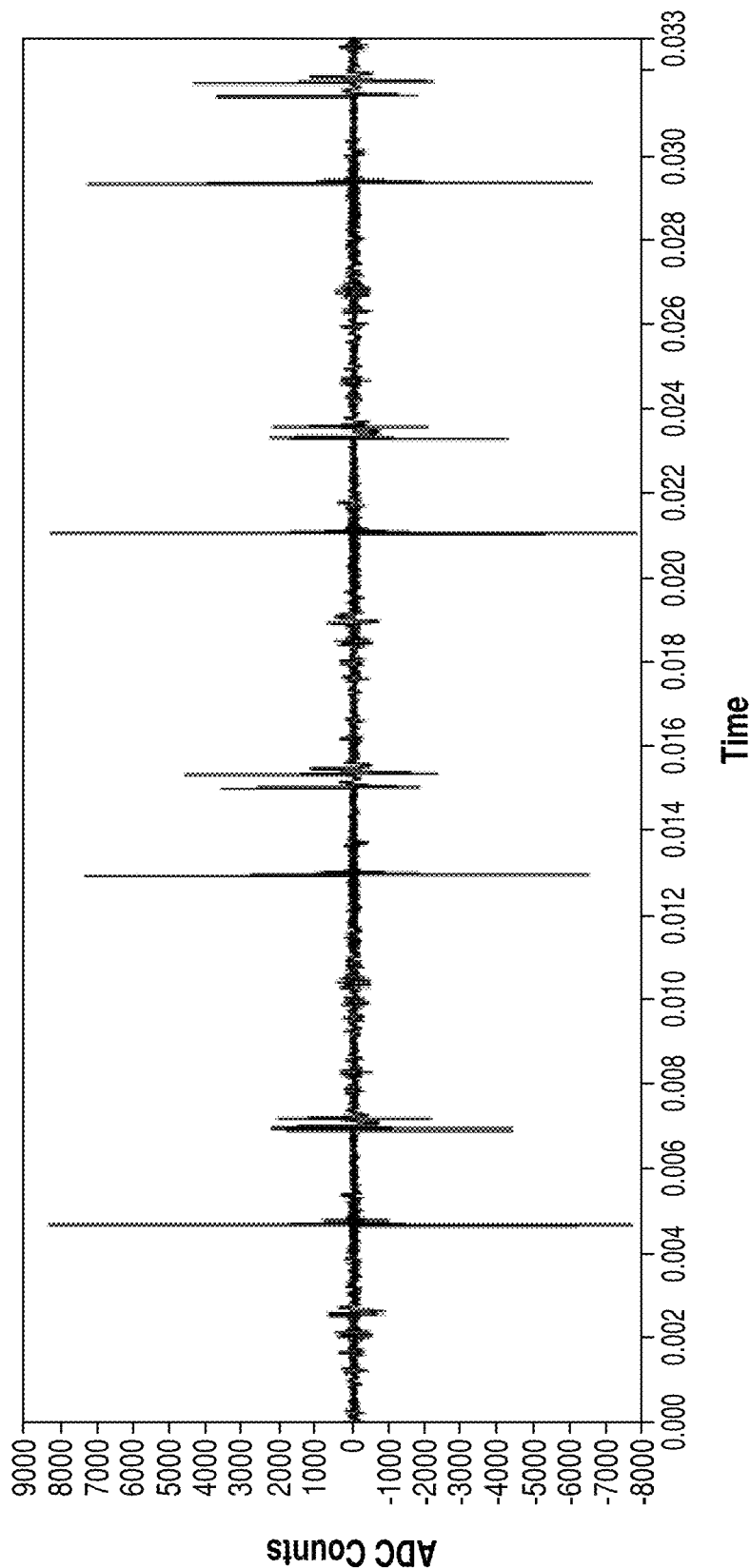
FIG. 2 illustrates exemplary time domain data taken by data acquisition device of FIG. 1 for the time duration of two alternating current cycles.

FIG. 2 illustrates a graph of two AC cycles of exemplary time domain data taken by data acquisition device 110. As can be seen, the pattern of device signals seen in the first half of the graph is repeated in the second half of the graph. This repetition is because the devices causing the noise do so deterministically with respect to the AC voltage (and in some cases depending on their load current draw). From FIG. 2, it can be seen that the high frequency capture can be time synchronized to the AC waveform.

Figure 3:
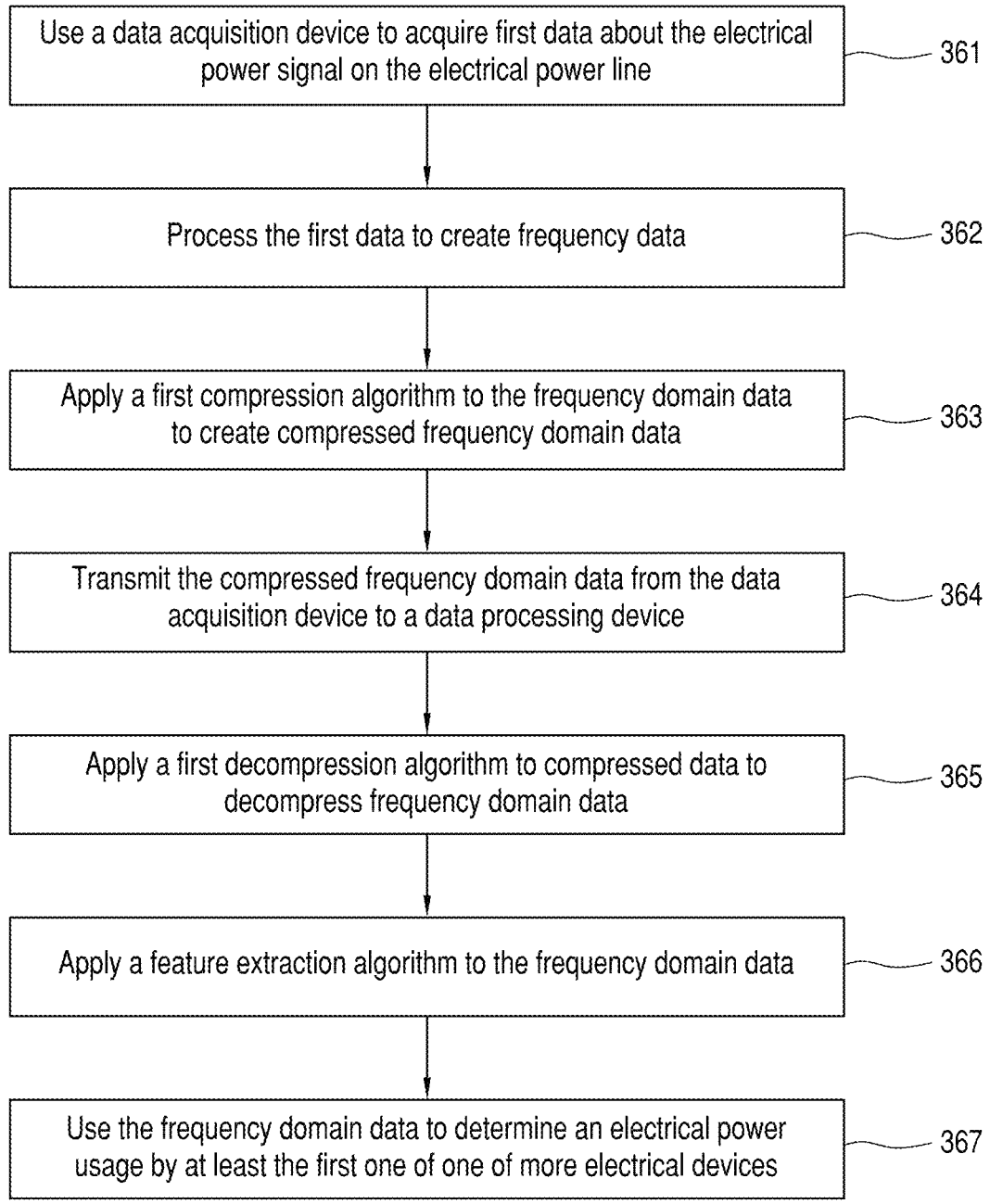
FIG. 3 illustrates a flow chart for an embodiment of a method of determining usage of one or more electrical devices coupled to an electrical power line.

FIG. 3 illustrates a flow chart for an embodiment of a method 300 of detecting usage of one or more electrical devices coupled to an electrical power line. Method 300 is merely exemplary and is not limited to the embodiments presented herein. Method 300 can be employed in many different embodiments or examples not specifically depicted or described herein. In some embodiments, the activities, the procedures, and/or the processes of method 300 can be performed in the order presented. In other embodiments, the activities, the procedures, and/or the processes of method 300 can be performed in any other suitable order. In still other embodiments, one or more of the activities, the procedures, and/or the processes in method 300 can be combined or skipped.

Referring to FIG. 3, method 300 includes an activity 361 of using a data acquisition device to acquire first data about the electrical power signal on the electrical power line. In many embodiments that data capture can be cyclostationary. For example, cyclostationary data capture can be performed using a low speed microprocessor to generate line synchronization pulses. In some examples, activity 361 can include: (1) sampling with a low speed microprocessor (such as msp430AFE) the AC line at 4 kSps (DC-2 kHz bandwidth); (2) utilizing a high resolution timer (2 MHz) in the microprocessor to determine the time at which each low frequency (4 kSPS) AC line sample occurred; (3) using the time and voltage of the two samples around the positive-to-negative zero crossing, a linear interpolation can be performed to compute (in the high resolution timer counts) the time at which the zero crossing occurred; (4) comparing the zero crossing time information with that from the previous cycle to determine the AC period; (5) using the AC period and the timing of the zero crossing can be used to estimate the zero crossing point for the next half cycle (negative to positive zero cross) with high accuracy and very low jitter. A timing pulse of this zero crossing is sent from this microprocessor to the high speed ADC; (6) sampling using the high speed (2 MSPS) ADC the high frequency voltage signal at a fixed delay from the zero crossing. The high speed ADC captures a fixed portion of the AC cycle (in this implementation 32768 samples which equals 98.3% of AC cycle); and (7) stopping acquisition on the high-speed ADC to awaiting the next zero crossing detection pulse. This data (hereinafter, cyclostationary data) is used for all high frequency signal processing described herein.

Method 300 in FIG. 3 continues with an activity 362 of processing the first data to create frequency domain data. In some examples, activity 362 can compute the frequency domain spectrum, further improve the SNR, and extract the interference spectrum.

As an example, activity 362 can include: (1) isolating a 4096 point block (Fs=2 MSPS) corresponding to the highest amplitude and lowest amplitude portions of the AC waveform. This corresponds to the portion 68-112 degrees and 248-292 degrees; (2) apply a window function to the data blocks; (3) zero pad the data and compute an 8192 point FFT of the data blocks; (4) compute the log magnitude of the absolute value (or real component) of the data blocks; (5) discard the negative frequency bins; (6) average the two magnitude FFT traces; (7) apply a smoothing function (for example, a triangular FIR smoothing filter). This data represents the signal spectrum for this AC cycle; (8) isolate a 2048 point block corresponding to the zero crossing portion of the AC waveform. This corresponds to the 169-191 degree section of the AC cycle; (9) apply a window function to the data block; (11) zero pad the data and compute an 8192 point FFT of the data blocks; (12) compute the log magnitude of the absolute value (or real component) of the data blocks; (13) discard the negative frequency bins; and (13) applying a smoothing function (for example a triangular FIR smoothing filter). This data represents the interference spectrum for this AC cycle.

Figure 4:
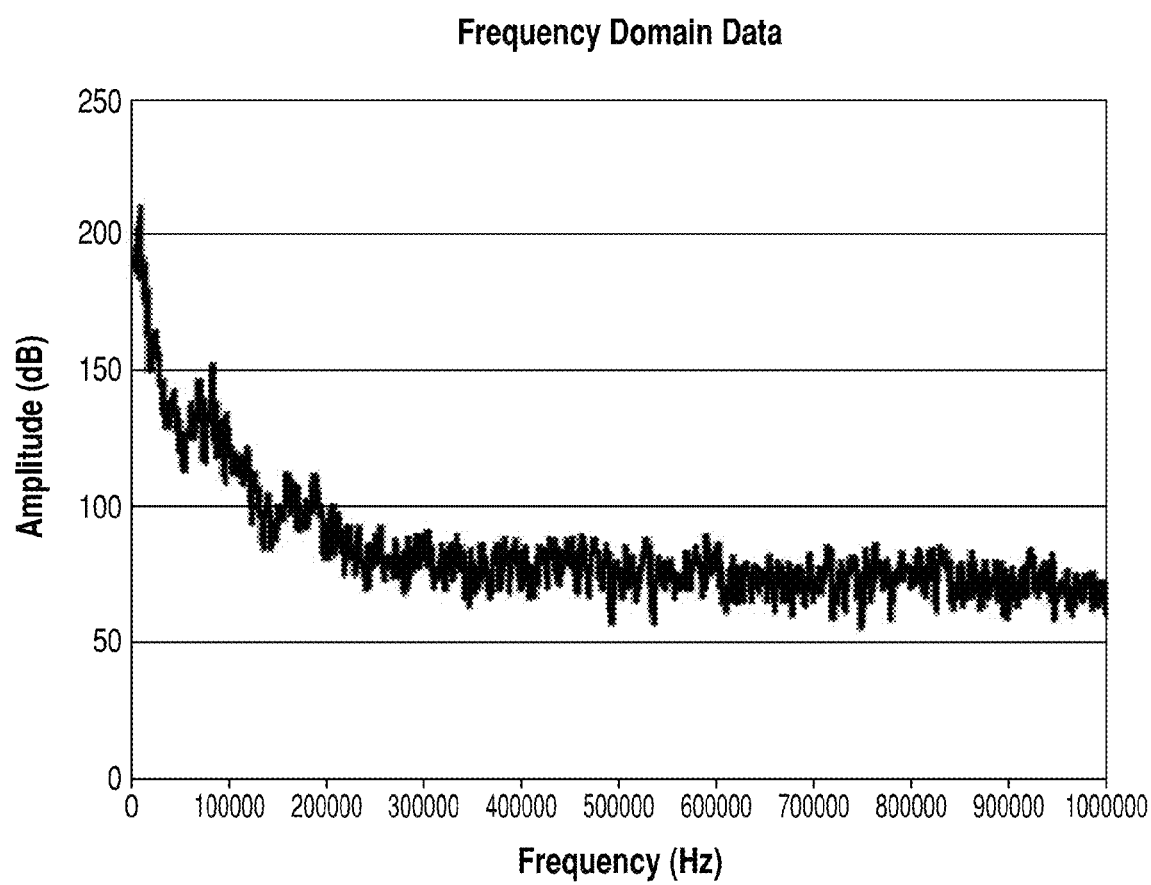
FIG. 4 illustrates an exemplary graph of exemplary signal after the two windowed fast Fourier transforms were performed on the exemplary signal.

In some examples, a windowed FFT (fast Fourier transform) is performed at the AC maxima and another windowed FFT is performed at the AC minima and plotting them together. FIG. 4 illustrates an exemplary graph of exemplary signal after the two windowed FFTs were performed. In FIG. 4, it can be seen of the shows that the traces can be similar. SNR (signal to noise ratio) can be improved by averaging these two FFTs together. In addition, certain low cost switches may only show signals during one-half of the AC cycle so it can be important in some embodiments to average both the FFTs.

Figure 5:
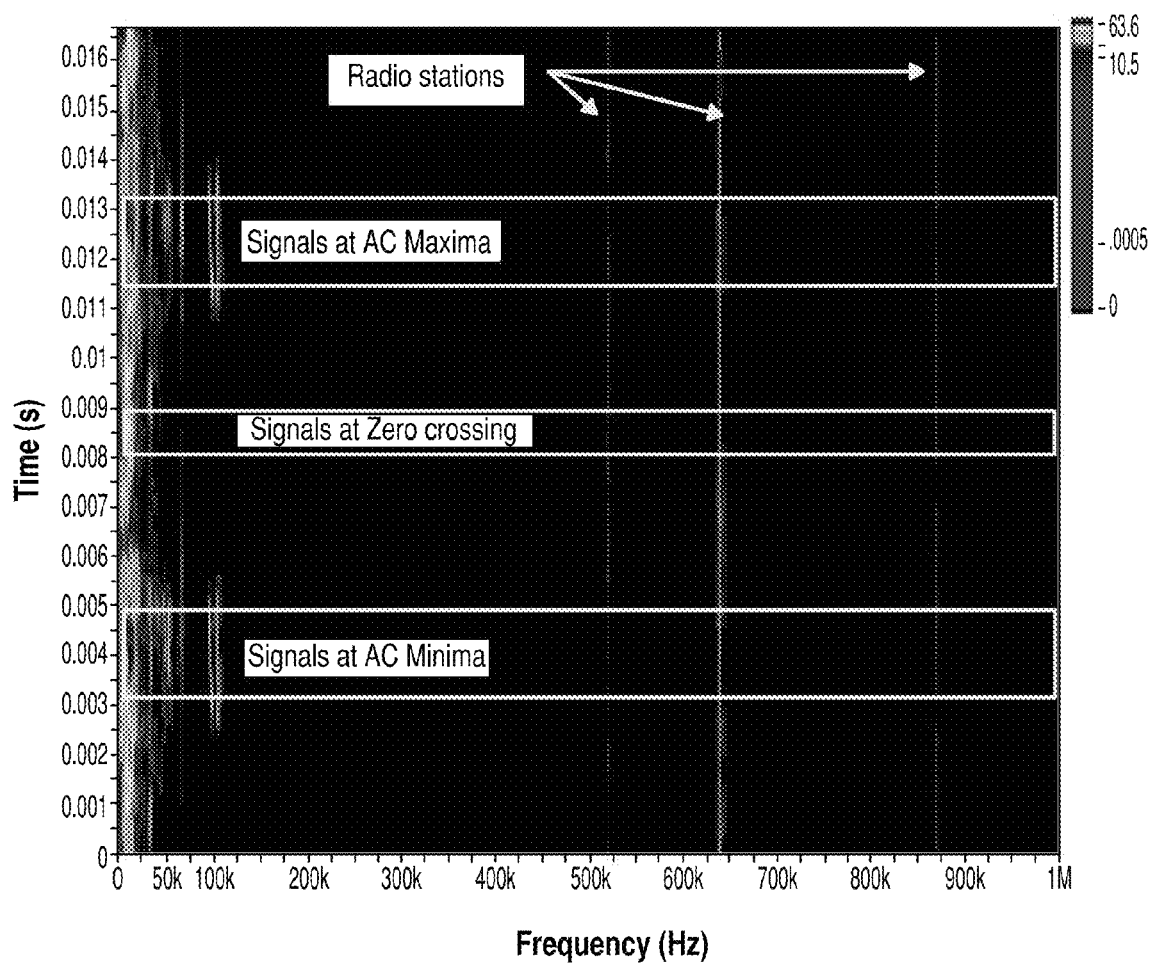
FIG. 5 illustrates an exemplary graph of the exemplary signal of FIG. 4 after application of a short time Fourier transform to the exemplary spectrogram.
Figure 6:
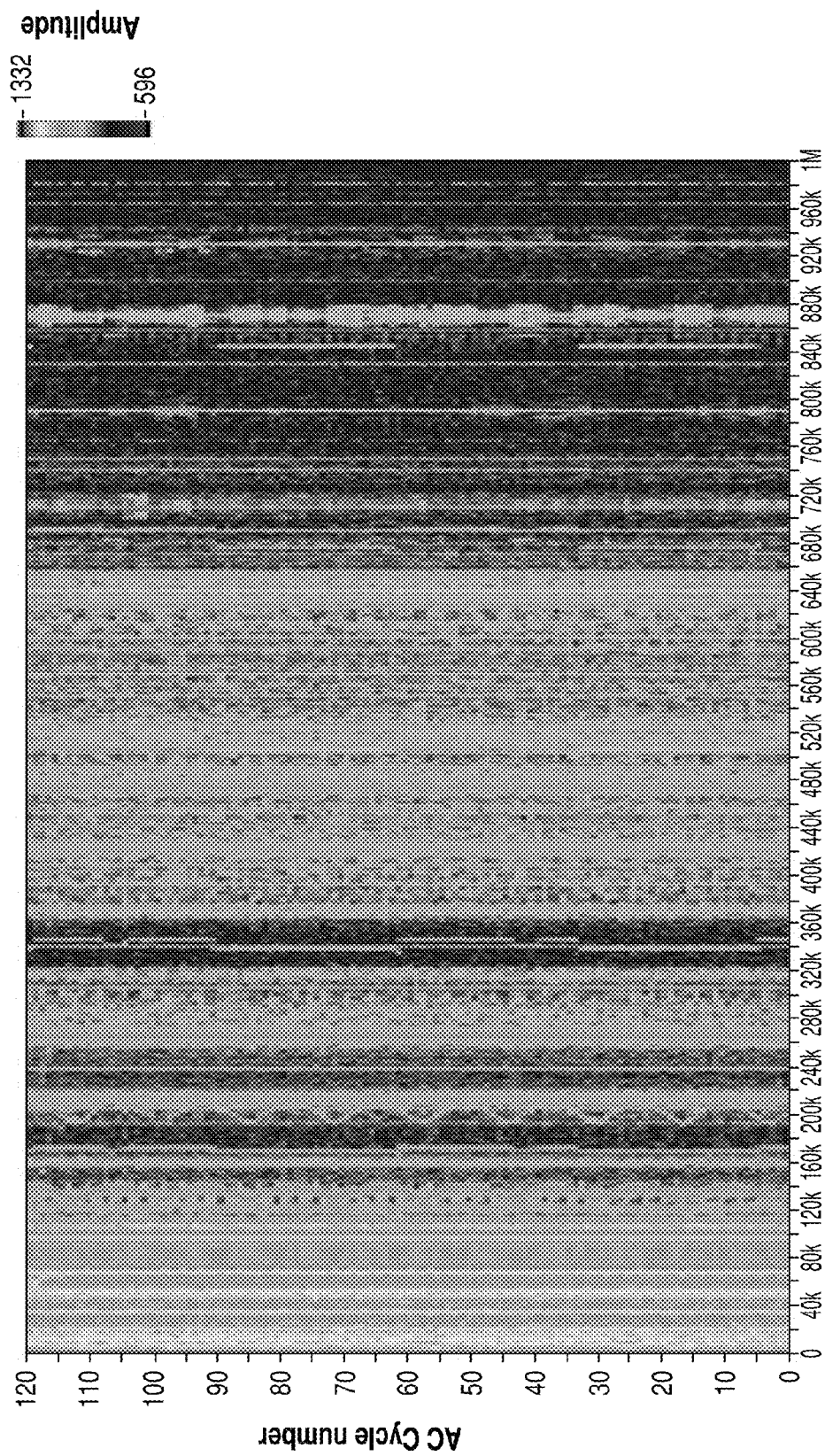
FIG. 6 illustrates an exemplary signal spectrum over two seconds (120 AC cycles), as generated using activity 362 of FIG. 3.

FIG. 5 illustrates an exemplary graph of a signal after application of a SIFT (short time Fourier transform). FIG. 5 shows a quiet period between the portions with the switch-mode power supply frequencies. By determining which of the signals seen are present with approximately constant amplitude during the zero crossing section and at the AC waveform peaks, the interference from the signal of interest can be isolated. FIG. 6 illustrates an exemplary signal spectrum over two seconds (120 AC cycles), as generated using activity 362 of FIG. 3.

Another aspect of the SIFT plot worth noting is the presence of the vertical lines at approximately 540 kHz (kilohertz), 660 kHz and 880 kHz. These traces correspond to AM (amplitude modulation) broadcast stations. One exemplary method to separate interference signals (radio, other communication signals etc) is to utilize the fact that interference sources will have a similar amplitude at the zero crossing and peak/trough of the AC waveform. The switching supply oscillators are also present during this time but as the diodes in the rectifier bridge prior to switcher are not conducting fully so very little of their signal is conducted to the sensor.

In some examples, activity 363 can also include apply a procedure to remove large amplitude transient signals before isolates the 4096 blocks.

Referring again to FIG. 3, method 300 of FIG. 3 includes an activity 363 of applying a first compression algorithm to the frequency domain data to create compressed frequency domain data. In some examples, the data acquisition device can be used to apply the first compression algorithm. As an example, activity 363 can include: (1) accumulate each 4096-point FFT until 1024 and the data is packed into a 1024×4096 first array; (2) running the first array through the first compression process. In some examples, the first compression process can be the JPEG or JPEG2000 compression processes. In the same or different examples, the compression process can provide 50× compressions. In other examples, other compression methods can be used. In yet other examples, compression between frames can be implemented by applying a video compression algorithm, for example Motion JPEG, Motion PEG 2000, H.264/MPEG-4 AVC, or HVEC/H.265.

The combination of activities 361-363 can compress the data by 800×, while retaining the information of interest with high fidelity. This amount of compression allows the data (e.g., the Spectrogram) to be transmitted to a remote server (e.g., data processing device 120) over a network using a limited amount of bandwidth. All subsequent processing steps can be undertaken on the remote server in some examples.

Method 300 in FIG. 3 continues with an activity 364 of transmitting the compressed frequency domain data from the data acquisition device to a data processing device. In some examples, the compressed frequency domain data can be transmitted over one or more wired or wireless networks.

Subsequently, method 300 of FIG. 3 includes an activity 365 of applying a first decompression algorithm to compressed frequency data to decompress the frequency domain data. In some examples, the data processing device can apply the first decompression algorithm. In some examples, the data processing device can decompress the compressed frequency domain data. The decompression process can correspond to the compression process used in activity 363.

Next, method 300 of FIG. 3 includes an activity 366 of applying a feature extraction algorithm to the frequency domain data. In some examples, applying the feature extraction algorithm can determine a transition of an electrical state of at least a first one of the one or more electrical devices. In some embodiments, activity 366 can be considered a disaggregation process involves noise reduction, a feature extraction process, and a correlation process between HF (high frequency) signatures and power changes.

Figure 7:
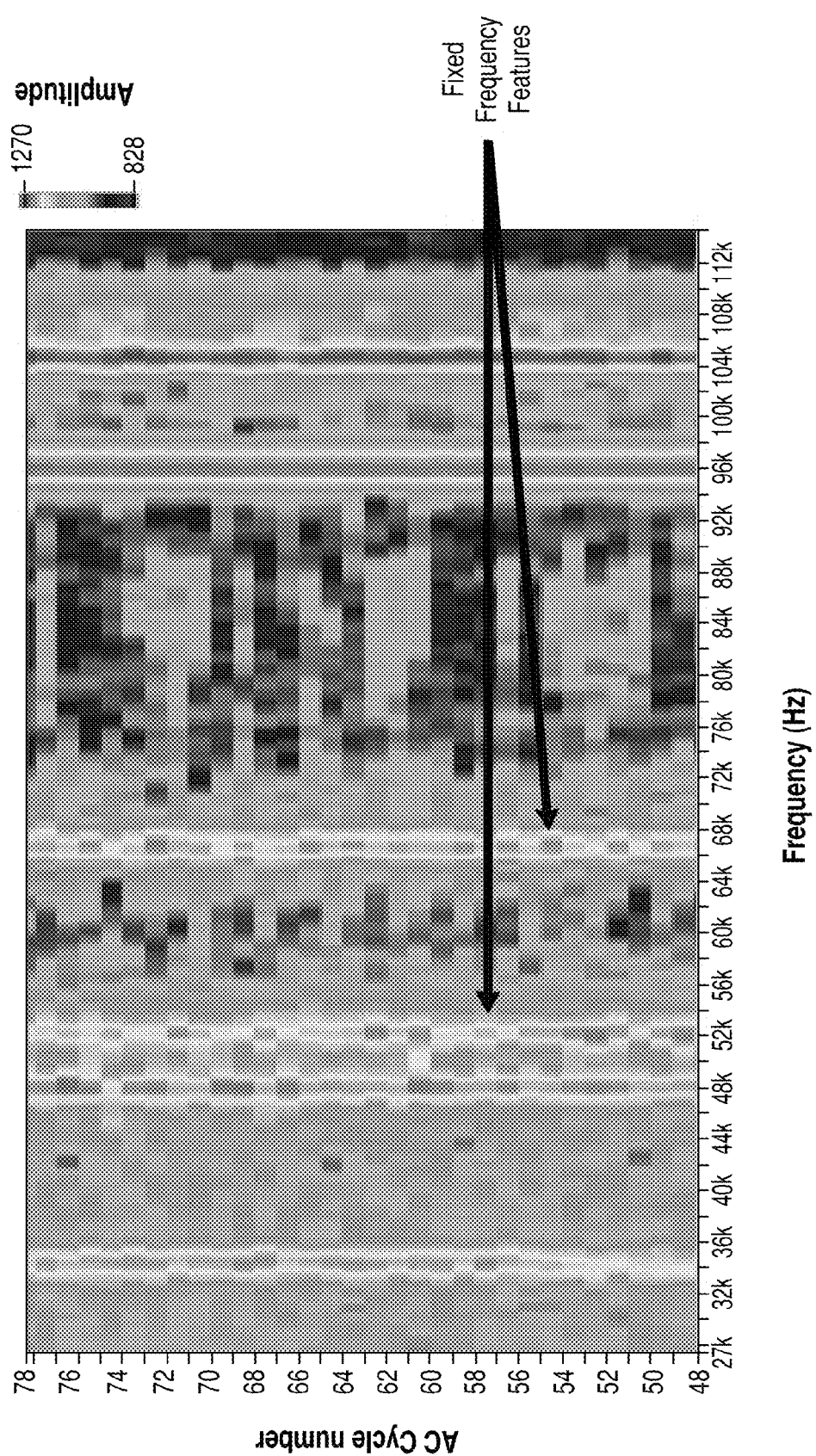
FIG. 7 illustrates an example of fixed frequency features in the exemplary signal spectrum of FIG. 6.
Figure 8:
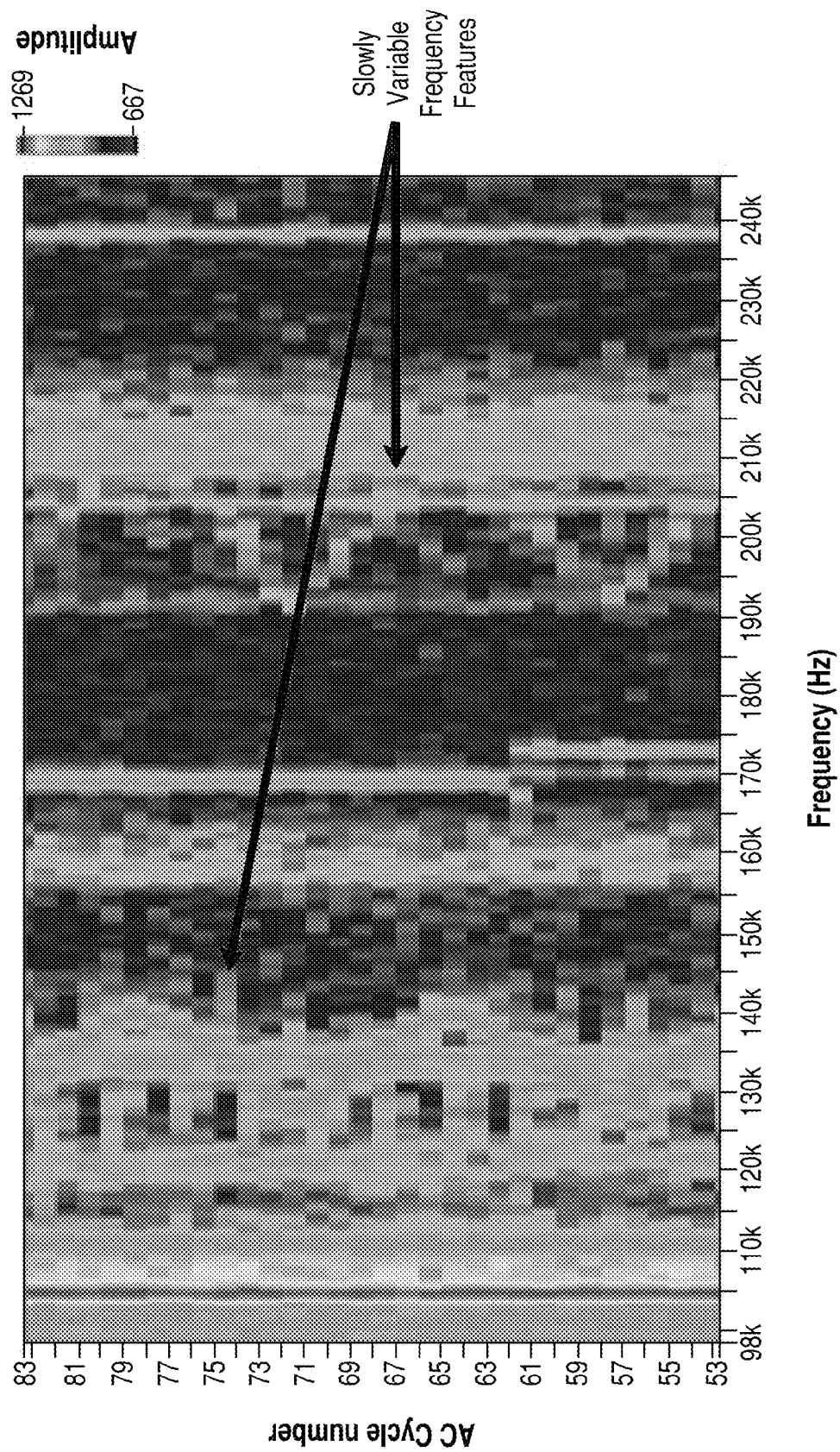
FIG. 8 illustrates an example of a slowly variable frequency feature in the exemplary signal spectrum of FIG. 6.
Figure 9:
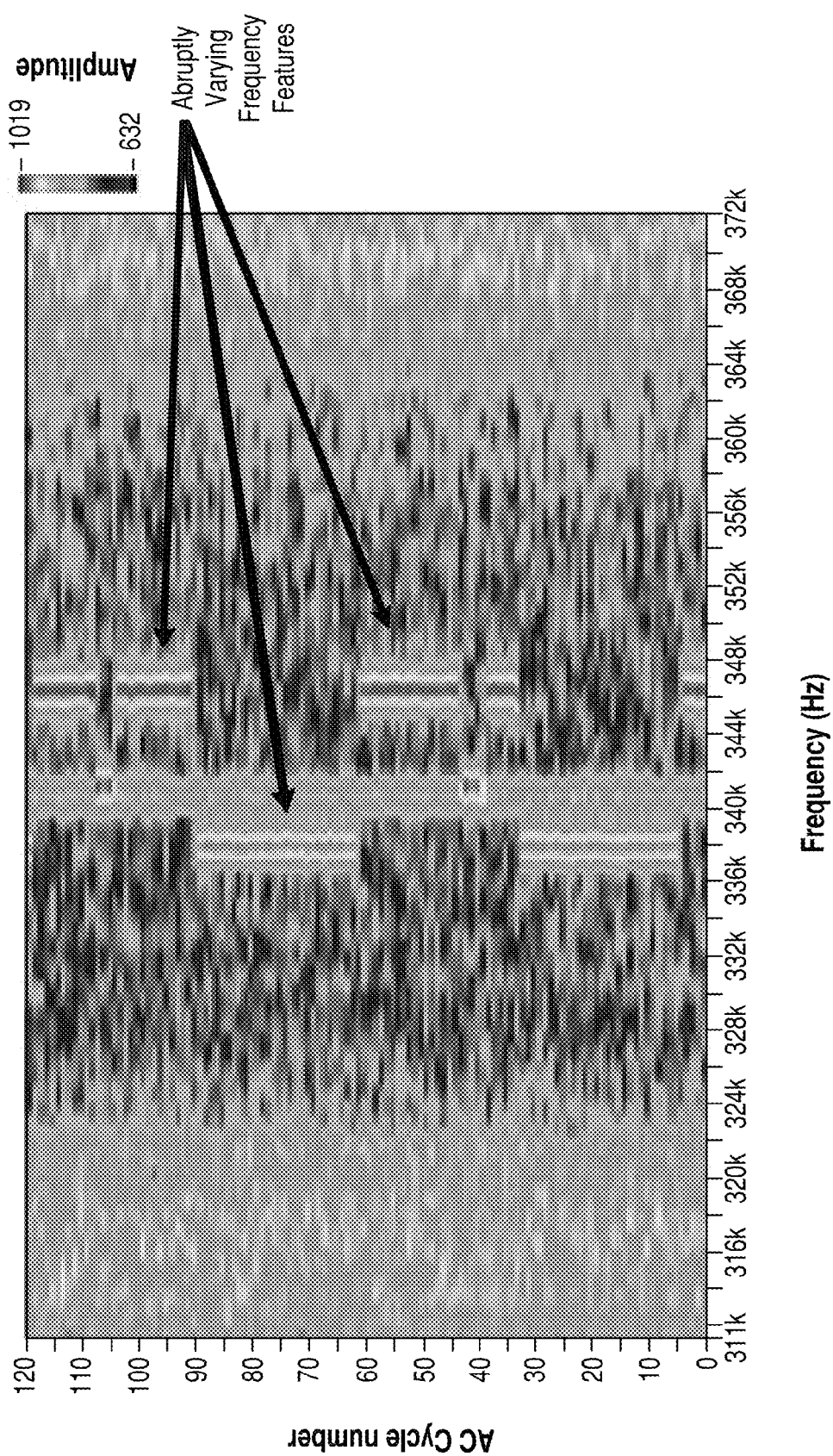
FIG. 9 illustrates an example of an abruptly varying frequency features in the exemplary signal spectrum of FIG. 6.

Referring again to FIG. 6, upon closer inspection of FIG. 6, three main types of signal features exist in the frequency domain data: (a) fixed frequency features; (b) slowly variable frequency features (from variable frequency switching supplies); and (c) abruptly varying frequency features. FIG. 7 illustrates an example of fixed frequency features. Fixed frequency feature can be represented as straight lines in FIGS. 6 and 7. FIG. 8 illustrates an example of a slowly variable frequency feature. Slowly variable features can be represented by triangular or zigzag patterns in FIGS. 6 and 8. FIG. 9 illustrates an example of an abruptly varying frequency features. An abruptly varying frequency feature can be represented by discontinuous line segments in FIGS. 6 and 9.

Reducing the amount of noise serves to reduce the false detects of frequency peaks while retaining the features of interest. A simple noise reduction technique can be, for example, to employ a moving average filter over consecutive cycles. Another simple noise reduction technique can be to employ a median filter. The drawback of the moving average and median filter techniques is that it would degrade the SNR of signal types shown in FIGS. 8 and 9. In addition, this averaging will change the location of the peaks to the same frequency as the fixed frequency peak.

One noise reduction technique that can be used would be to look at a few rows of the spectrogram (a few AC cycles) and discard any sections of the spectrogram which do not describe a vertical line (for fixed frequency switchers or radio interference) or lines of an angle up to X (for the variable frequency switches) (or a deviation from the mean by X). A further noise reduction could be employed to remove any peak with duration of less than n AC cycles, when n is a predetermined number (e.g., two or three).

One method to reduce interference is to apply a feature extraction method on the interference data and then compare those extracted features with the ones collected from the signal spectrogram. If a peak on the signal table is within a small frequency and amplitude offset from a peak on the interference table, it is deemed to be external interference (radio, etc.) and it can be discarded.

To this point, the HF (high frequency) data collected has been in the form of a single spectrogram, which contains all of the HF peaks from electrical devices present on the electrical infrastructure. This activity separates the spectrogram into the trajectories of the individual peaks, which that serve as features to be associated with specific electrical devices.

The HF signature extraction process can operate on spectrogram data to extract HF signatures, where a signature is defined as a temporal sequence of frequency peaks in the spectrogram. In some examples, this process employs a statistical model to calculate the probability that a series of frequency peaks forms an HF signature.

Figure 10:
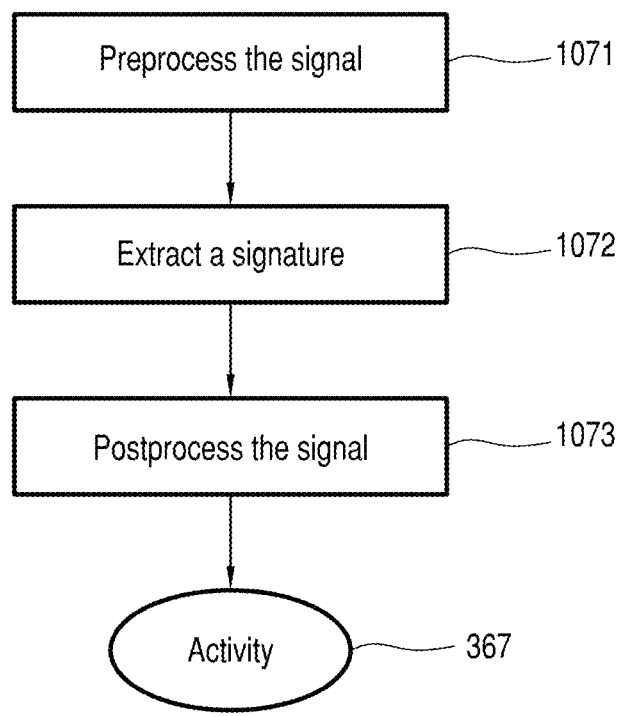
FIG. 10 illustrates a flow chart for an exemplary embodiment of an activity of applying a feature extraction algorithm to the frequency domain data, according to the first embodiment.

FIG. 10 illustrates a flow chart for an exemplary embodiment of activity 366 of applying a feature extraction algorithm to the frequency domain data, according to the first embodiment.

Referring to FIG. 10, activity 366 includes a procedure 1071 of preprocessing the signal. Prior to signature extraction, the spectrogram can be low-pass filtered in both time and frequency to, for example, 1) reduce spurious noise and 2) smooth the HF signatures to mitigate any temporal gaps in the HF signatures that may be present in the spectrogram. Following the low-pass filtering, the spectrogram can be separated into steady state and transient components. This can be accomplished by adaptively estimating the steady-state portion of the spectrogram (via a lagged mean outside a temporal guard band of appropriate length), and then subtracting the steady-state estimate from the original spectrogram to find the estimate of the transient portion of the spectrogram.

Subsequently, activity 366 of FIG. 10 includes a procedure 1072 of extracting a signature. HF signature extraction can be performed independently on the steady state and transient components of the spectrogram. The statistical model for the HF signature assumes a probability density function (pdf) describes the evolution of the signature frequency over time, thus, the pdf is over the change in frequency from one time step to the next. In addition, the probability of a frequency peak belonging to a signature is assumed to be related to the magnitude of the peak. With these probability models, the probability that a sequence of frequency peaks forms an HF signature can be calculated.

The HF signature extraction is performed sequentially and simultaneously for all potential HF signatures via dynamic programming. At each time procedure: (1) existing potential signatures are examined to determine if they can be extended to the current time step. If multiple extensions are possible, the most probable extension is selected; (2) frequency peaks in the current time step which are not an extension of a previous potential signature are added to the list of potential signatures; and (3) existing potential signatures which are not extended to the current time step are terminated.

At the conclusion of this process, there is a list of candidate signatures, each of which is characterized by a sequence of frequency peaks at given times and has an associated probability.

Next, activity 366 of FIG. 10 includes a procedure 1073 of post processing of the signal. Some electrical devices exhibit an initial HF transient upon startup followed by a steady-state HF signature while in operation. Similarly, an electrical device with a steady-state signature while in operation may produce an HF transient upon shutdown. After the steady state and transient signatures have been extracted independently, they are stitched together to form complete HF signatures for each device by identifying signatures where the end (or beginning) of a transient HF signature is collocated with the beginning (or end) of a HF steady-state signature.

Figure 11:
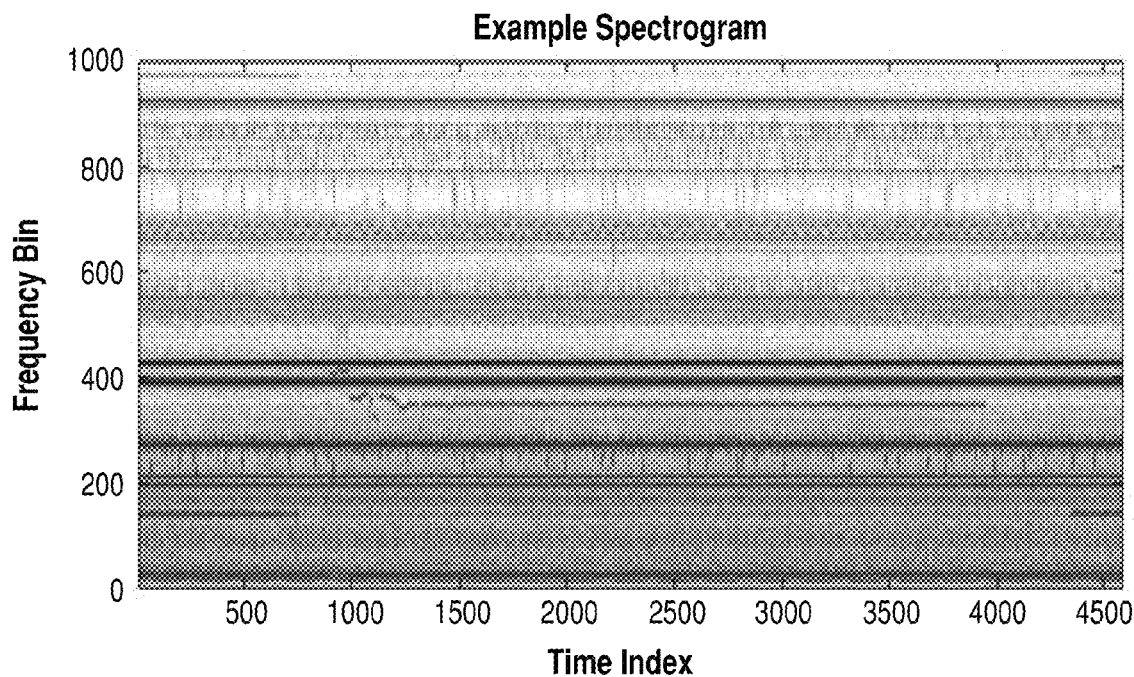
FIG. 11 illustrates a spectrogram of exemplary data, as generated using procedure 1073 of FIG. 10.
Figure 12:
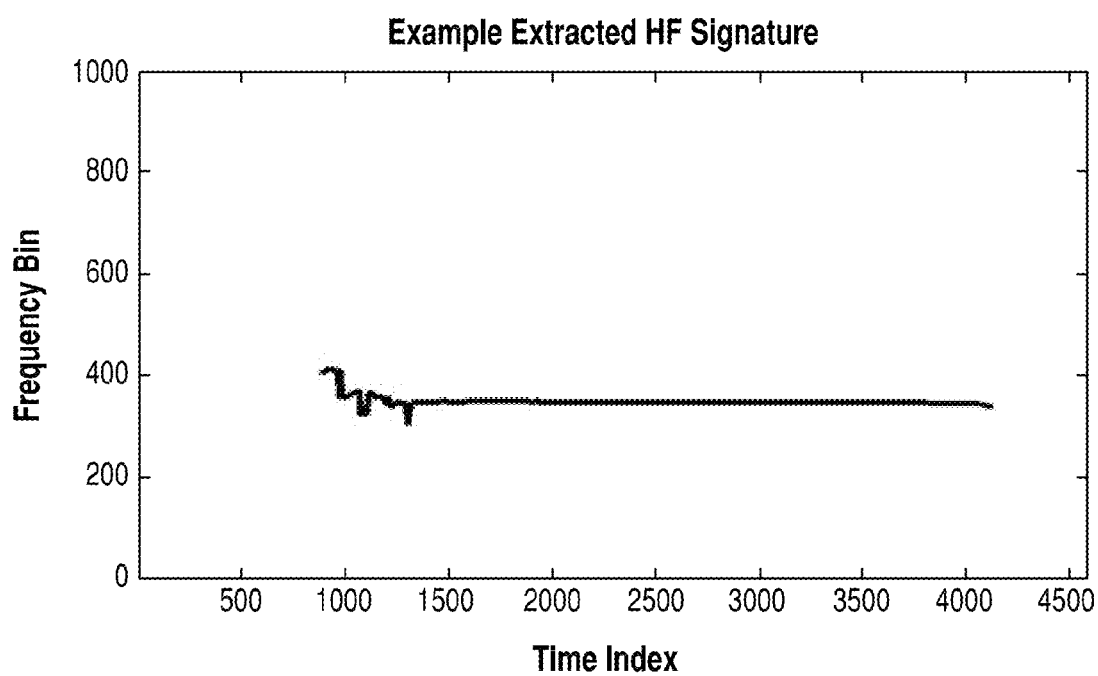
FIG. 12 illustrates the peak for the target device isolated and extracted from the spectrogram of FIG. 11.

FIG. 11 illustrates a spectrogram of exemplary data. The variable frequency peak around times 800 and 3800 is the target of the peak-tracking algorithm. FIG. 12 illustrates the peak for the target device isolated and extracted from the remaining spectrogram. As can be seen in FIG. 12, the peak of the target device has a transient portion (e.g., the portion of the peak form approximately time 750 to approximately times 1500) and a steady-state portion (e.g., the portion of the peak from time 1500 to approximately time 3800). These portions can be separately extracted as part of procedure 1072 and recombined in procedure 1073.

Another technique for peak extraction would utilize image processing techniques to resolve curves and lines over many cycle of the spectrogram (for example 1 second or 60 cycles). These image processing techniques may include (but are not limited to) use of the haugh transform, performing a 2D FFT, applying a kernel algorithm. These processes could resolve the features into curves for the variable frequency switchers or straight lines in the case of fixed ones.

Another important aspect of the spectrogram is that some of the devices have harmonics, which move in unison with the fundamental (e.g., peak at X, harmonic at 2X, 3X etc.). The peak extractor can use this behavior to group the harmonics of a device. This behavior is especially useful when the fundamental of two devices occupy the same frequency bin but the small difference in their fundamental frequency leads to a larger separation at the nth harmonic. This harmonic behavior can also be used by the denoising algorithm to predict the presence of a peak amongst the noise when another harmonic has been detected. After procedure 1073, activity 366 is complete.

Method 300 in FIG. 3 continues with an activity 367 of using the frequency domain data to determine an electrical power usage by at least the first one of the one or more electrical devices. In some examples, HF signatures and power changes can be correlated to determine an electrical power usage by one electrical device.

HF signals can primarily be divided into two types: (a) fixed frequency signature; and (b) variable frequency signature (variation can be proportional or inversely proportional to power consumption).

Figure 13:
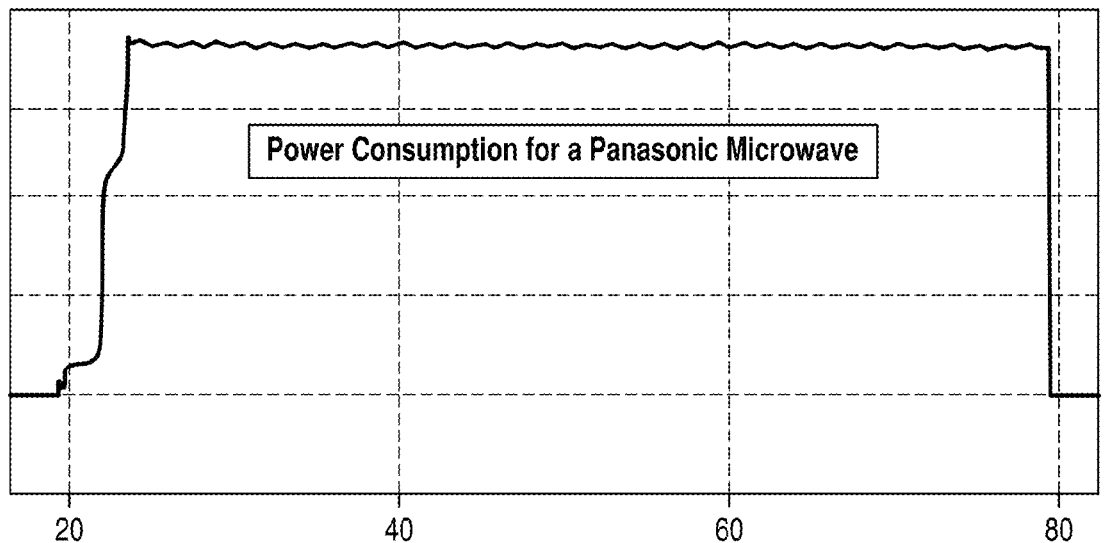
FIG. 13 illustrates an example of power consumption for an exemplary electrical device.
Figure 14:
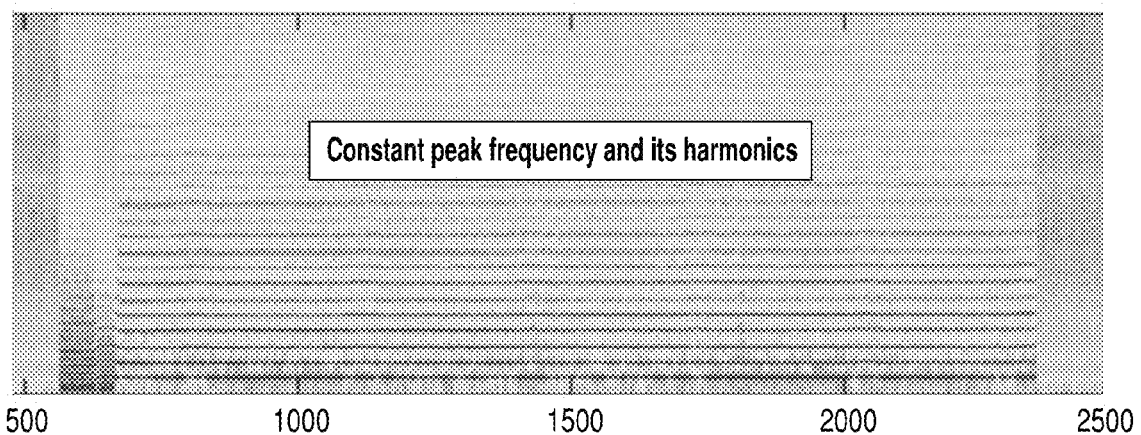
FIG. 14 illustrates an example of the constant peak frequency and the harmonics for the exemplary electrical device of FIG. 13.

In case of fixed frequency signature, the peak frequency is identified using suitable image processing techniques and its appearance and disappearance is tracked to detect the on and off transitions of the appliance. FIG. 13 illustrates an example of power consumption for an exemplary electrical device. FIG. 14 illustrates an example of the constant peak frequency and the harmonics for the exemplary electrical device of FIG. 13.

In case of variable frequency signature where the frequency varies with respect to the changes in power consumption of the appliance a more advanced procedure is employed. The peak frequency is tracked continuously to monitor the changes to the peak. The variation in peak frequency is correlated with the variation in power consumption at the same time to identify the presence of the appliance. The on and off state transitions are identified based on the output of correlation as before.

Figure 15:
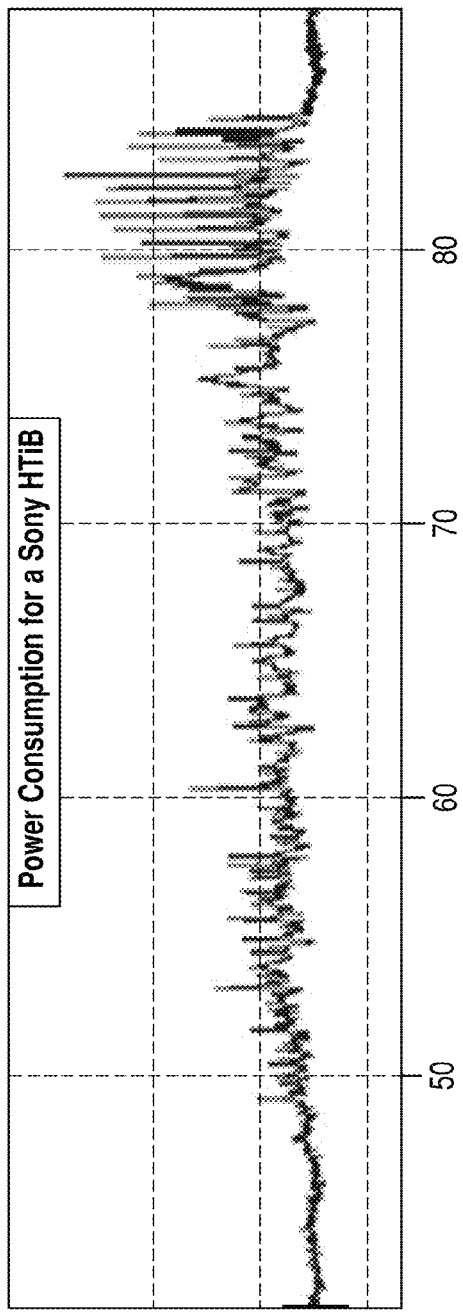
FIG. 15 illustrates an example of power consumption for a second exemplary electrical device.
Figure 16:
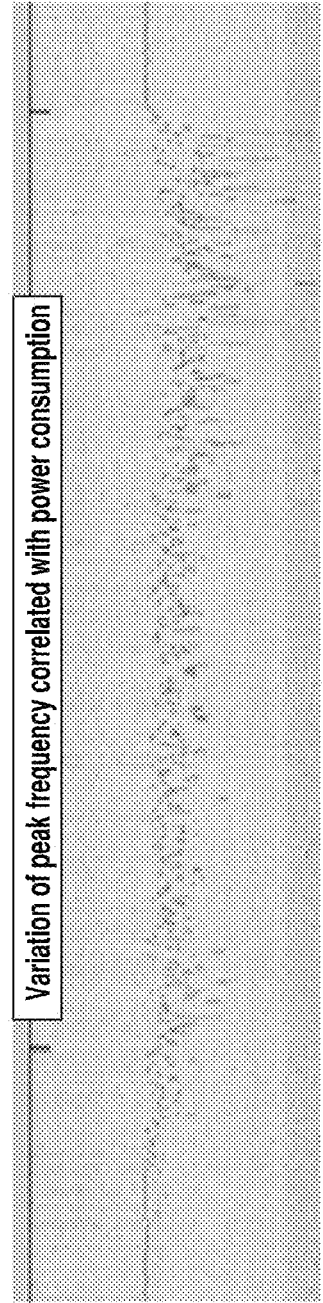
FIG. 16 illustrates an example of the variation of peak frequency and the correlation between peak frequency and power consumption for the exemplary electrical device of FIG. 15.

The correlation of HF and power signals can be carried out in two different ways. In a first embodiment, it is assumed that the HF spectrogram is processed with the aforementioned peak-tracking activity (e.g., activity 366). This activity can extract prominent peaks in the spectrogram in presence of spurious noisy peaks and tracks them with respect to time. Thus, output of this activity is a finite number of peaks that travel in time. These tracked peaks can then be correlated with the power plot to extract variable frequency SMPS appliances. If the correlation is below a set threshold, then that particular peak is discarded, otherwise, the peak with high correlation above the set threshold is considered as due an appliance in the house with variable frequency SMPS. FIG. 15 illustrates an example of power consumption for a second exemplary electrical device. FIG. 16 illustrates an example of the variation of peak frequency and the correlation between peak frequency and power consumption for the exemplary electrical device of FIG. 15.

Figure 17:
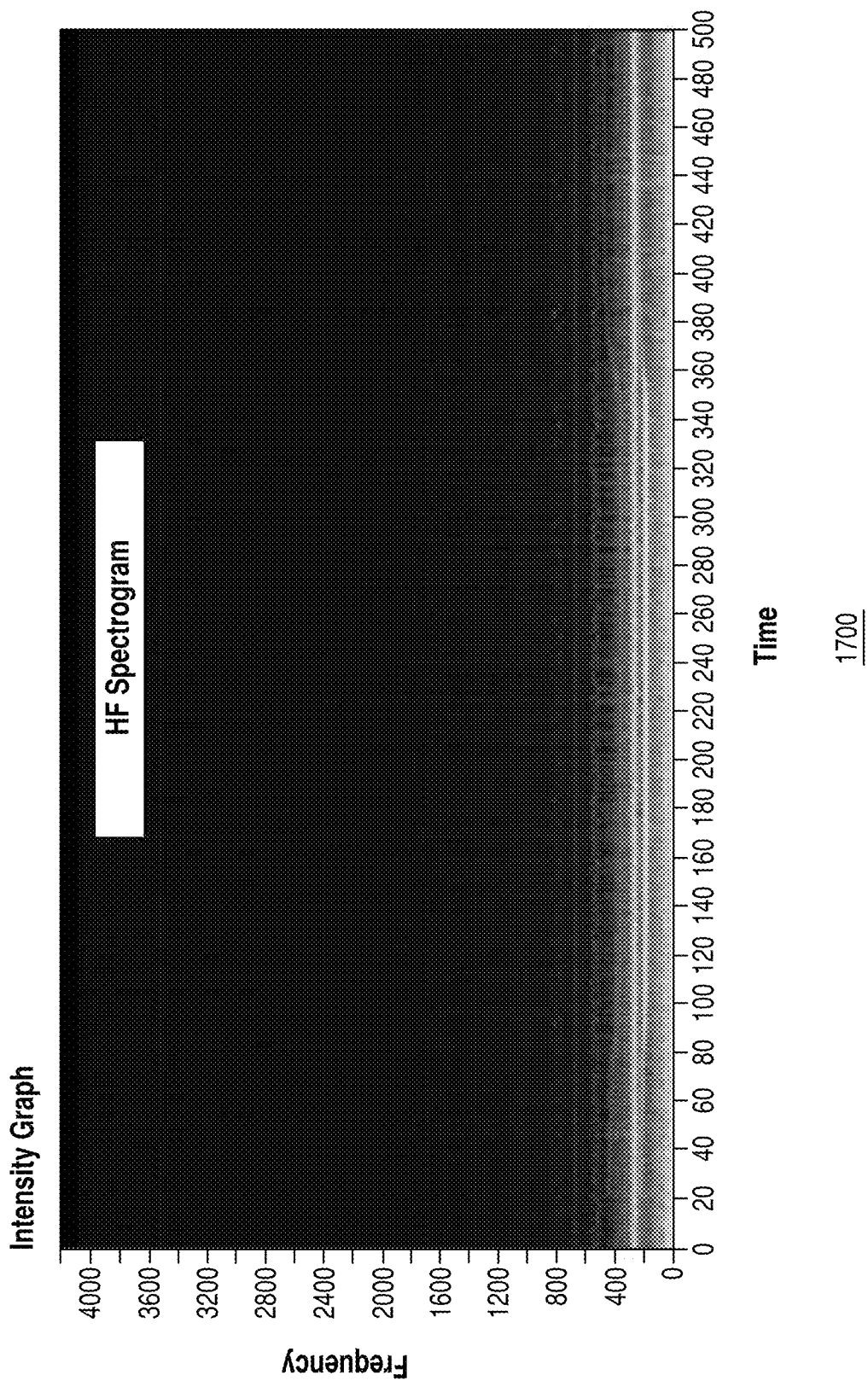
FIG. 17 illustrates an exemplary high-frequency spectrogram for a third exemplary electrical device.
Figure 18:
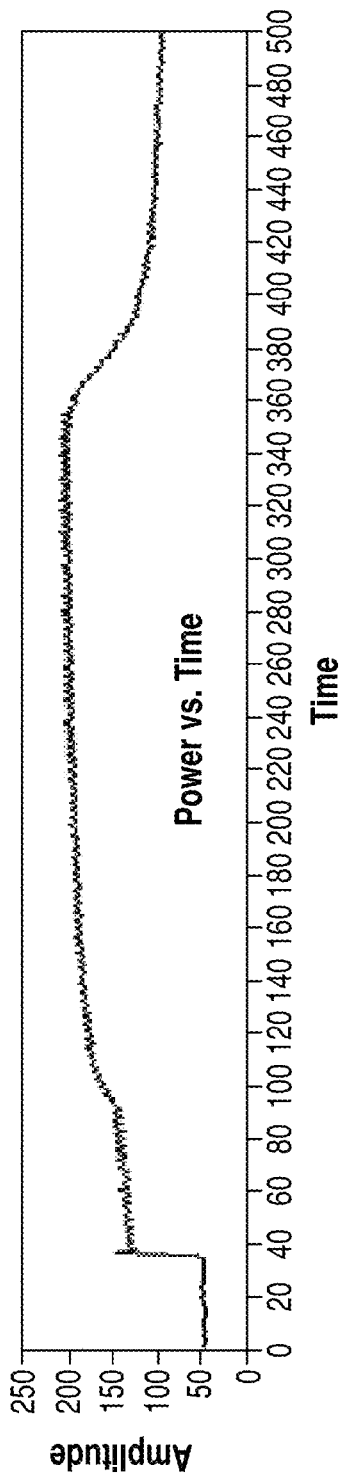
FIG. 18 is a graph illustrating the power versus time for the third exemplary electrical of FIG. 17.
Figure 19:
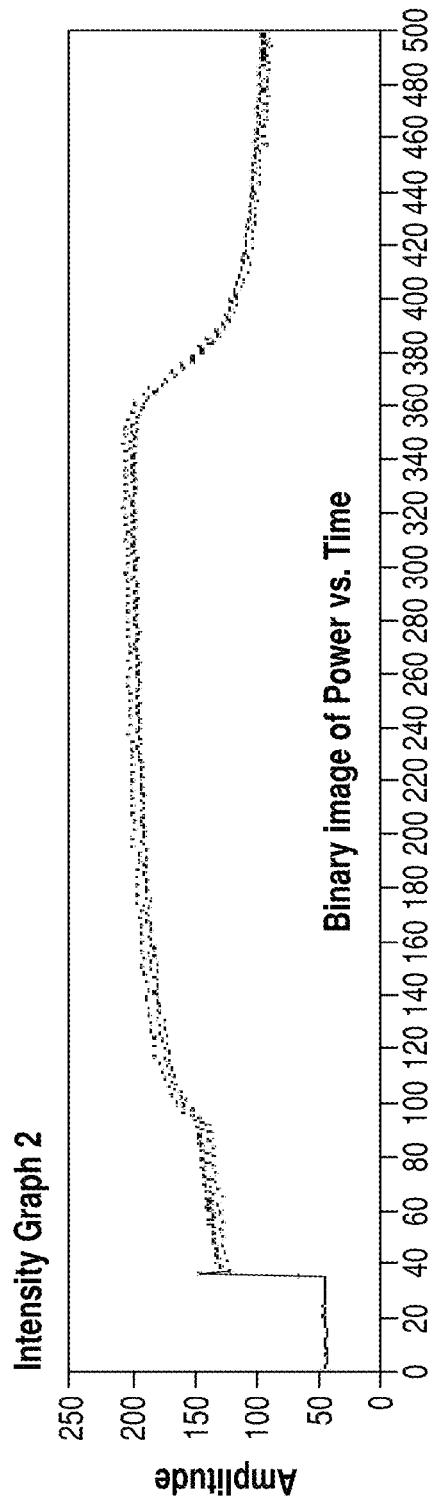
FIG. 19 is a graph illustrating a binary image of power versus time for the third exemplary electrical of FIG. 17.

In a second embodiment, the peak extractor algorithm (activity 366) is not used. The entire HF spectrogram can be converted into a binary image using a predefined threshold derived using empirical analysis. The power plot can be also converted into a binary image. The power plot image is then correlated (using 2D correlation) with the HF spectrogram from top to bottom with variable scaling factors. In each case, a set threshold is applied to detect the variable SMPS appliance as before. FIG. 17 illustrates an exemplary high-frequency spectrogram for a third exemplary electrical device. FIG. 18 is a graph illustrating the power versus time for the third exemplary electrical of FIG. 17. FIG. 19 is a graph illustrating a binary image of power versus time for the third exemplary electrical of FIG. 17. As shown in FIGS. 18 and 19, the output of the correlation process would provide a simple straight line corresponding to the duration of the time the appliance is on.

In some examples, the embodiments described herein can be used to capture high frequency signals (data up to a few MHz) synchronous to the AC line (cyclostationary) for the purpose of analyzing the acquired signals to determine the presence/absence of devices leaking EMI on to the AC line. In the same or different examples, the embodiments described herein can be used to separate transients from device actuation from the continuously produced transients from device like dimmers and selectively sending only the ones of interest (ones associated with device actuation) for processing. In many embodiments, the transient is captured along with the feature. The methods described herein can be used to separate signals from the switching supplies from interference sources (radio, PLC etc) and/or to separate the frequency changes induced by variable frequency loads from 'events' (device actuation).

Figure 20:
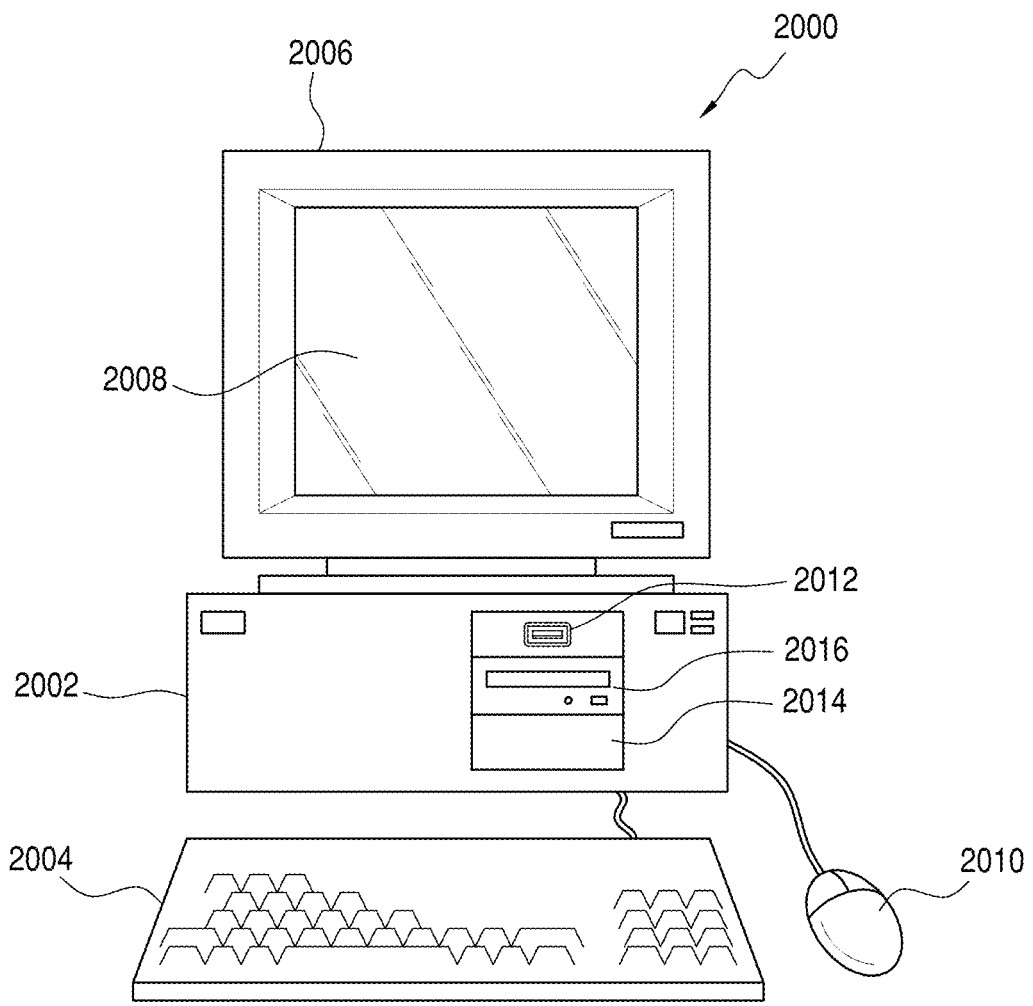
FIG. 20 illustrates a computer that is suitable for implementing an embodiment of computer system of FIG. 1.

FIG. 20 illustrates a computer 2000 that is suitable for implementing an embodiment of at least a portion of computer system described above (e.g., data processing device 120). Computer 2000 includes a chassis 2002 containing one or more circuit boards (not shown), a USB (universal serial bus) port 2012, a Compact Disc Read-Only Memory (CD-ROM) and/or Digital Video Disc (DVD) drive 2016, and a hard drive 2014. A representative block diagram of the elements included on the circuit boards inside chassis 2002 is shown in FIG. 21. A central processing unit (CPU) 2110 in FIG. 21 is coupled to a system bus 2114 in FIG. 21. In various embodiments, the architecture of CPU 2110 can be compliant with any of a variety of commercially distributed architecture families.

System bus 2114 also is coupled to memory 2108 that includes both read only memory (ROM) and random access memory (RAM). Non-volatile portions of memory 2108 or the ROM can be encoded with a boot code sequence suitable for restoring computer 2000 (FIG. 20) to a functional state after a system reset. In addition, memory 2108 can include microcode such as a Basic Input-Output System (BIOS).

In the depicted embodiment of FIG. 21, various I/O devices such as a disk controller 2104, a graphics adapter 2124, a video controller 2102, a keyboard adapter 2126, a mouse adapter 2106, a network adapter 2120, and other I/O devices 2122 can be coupled to system bus 2114. Keyboard adapter 2126 and mouse adapter 2106 are coupled to a keyboard 2004 (FIGS. 20 and 21) and a mouse 2010 (FIGS. 20 and 21), respectively, of computer 2000 (FIG. 20). While graphics adapter 2124 and video controller 2102 are indicated as distinct units in FIG. 21, video controller 2102 can be integrated into graphics adapter 2124, or vice versa in other embodiments. Video controller 2102 is suitable for refreshing a monitor 2006 (FIGS. 20 and 21) to display images on a screen 2008 (FIG. 20) of computer 2000 (FIG. 20). Disk controller 2104 can control hard drive 2014 (FIGS. 20 and 21), floppy disc drive 2012 (FIGS. 20 and 21), and CD-ROM or DVD drive 2016 (FIGS. 20 and 21). In other embodiments, distinct units can be used to control each of these devices separately.

Network adapters 2120 can be coupled to one or more antennas. In some embodiments, network adapter 2120 is part of a WNIC (wireless network interface controller) card (not shown) plugged or coupled to an expansion port (not shown) in computer 2000. In other embodiments, the WNIC card can be a wireless network card built into internal computer 2000. A wireless network adapter can be built into internal client computer 2000 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 2120 can be a wired network adapter.

Although many other components of computer 2000 (FIG. 20) are not shown, such components and their interconnection are well known to those of ordinary skill in the art. Accordingly, further details concerning the construction and composition of computer 2000 and the circuit boards inside chassis 2002 (FIG. 20) need not be discussed herein.

When computer 2000 in FIG. 20 is running, program instructions stored on stored on a USB drive in USB port 2012, on a CD-ROM or DVD in CD-ROM and/or DVD drive 2016, on hard drive 2014, or in memory 2108 (FIG. 21) are executed by CPU 2110 (FIG. 21). A portion of the program instructions, stored on these devices, can be suitable for carrying out the methods as previously described.

As used herein, "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 361-367 and procedures 1071-1073 may be comprised of many different activities, procedures and be performed by many different modules, in many different orders that any element of FIG. 1 may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of detecting electrical power usage of one or more electrical devices coupled to an electrical power line carrying an alternating current with a predetermined period, the one or more electrical devices place one or more distinguishable intrinsic noise sources on the electrical power line superimposed on the alternating current, the method comprising:

using a data acquisition device to acquire first data about the alternating current and the one or more distinguishable intrinsic noise sources on the electrical power line such that the acquiring of the first data is synchronized with the predetermined period of the alternating current;

processing the first data to create frequency domain data; and applying a feature extraction algorithm to the frequency domain data to determine a transition of an electrical power state of at least a first one of the one or more electrical devices, wherein:

the transition of the electrical power state of at least the first one of the one or more electrical devices comprises at least one of (1) a turning on of at least the first one of the one or more electrical devices, (2) a turning off of at least the first one of the one or more electrical devices, or (3) a varying of an amount of power consumed by at least the first one of the one or more electrical devices.

2. The method of claim 1, further comprising:
using the transition of the electrical power state of at least the first one of the one or more electrical devices to determine a first electrical power usage by at least the first one of the one or more electrical devices.

3. The method of claim 1, further comprising:
using the frequency domain data to determine a first electrical power usage by at least the first one of the one or more electrical devices.

4. The method of claim 1, wherein:
using the data acquisition device to acquire the first data comprises:
determining a zero crossing and the predetermined period of the alternating current; and
using the data acquisition device to sample the alternating current and the one or more distinguishable intrinsic noise sources at a predetermined delay from the zero crossing of the alternating current to create two or more cyclostationary signals; and
the first data comprise the two or more cyclostationary signals.

5. The method of claim 1, wherein:
the first data is cyclostationary with respect to the alternating current.

6. The method of claim 1, wherein:
using the data acquisition device to acquire the first data comprises:
determining when a zero crossing of the alternating current occurs;
determining the predetermined period of the alternating current;
using a timer of the data acquisition device to determine a time when to sample the one or more distinguishable intrinsic noise sources and the alternating current such that the one or more distinguishable intrinsic noise sources and the alternating current are sampled at a maximum and a minimum of a cycle of the alternating current; and
sampling the one or more distinguishable intrinsic noise sources and the alternating current using the data acquisition device.

7. The method of claim 1, wherein:
processing the first data to create the frequency domain data comprises:
using a first processor to process the first data to create the frequency domain data;
applying the feature extraction algorithm comprises:
using the first processor to apply the feature extraction algorithm to the frequency domain data to determine the transition of the electrical power state of at least the first one of the one or more electrical devices; and
the data acquisition device comprises the first processor.

8. The method of claim 1, further comprising:
before applying the feature extraction algorithm, using the data acquisition device to apply a first compression algorithm to the frequency domain data to create compressed frequency domain data;
transmitting the compressed frequency domain data from the data acquisition device to a data processing device; and
using the data processing device to apply a first decompression algorithm to the compressed frequency domain data to decompress the frequency domain data.

9. The method of claim 8, wherein:
processing the first data to create the frequency domain data comprises:
using a first processor to process the first data to create the frequency domain data;
applying the feature extraction algorithm comprises:
using a second processor to apply the feature extraction algorithm to the frequency domain data to determine the transition of the electrical power state of at least the first one of the one or more electrical devices;
the data acquisition device comprises the first processor; and
the data processing device comprises the second processor.

10. The method of claim 1, wherein:
applying the feature extraction algorithm comprises:
using the frequency domain data to identify one or more high frequency signatures in the one or more distinguishable intrinsic noise sources and the alternating current; and
determining which of the one or more electrical devices has each of the one or more high frequency signatures; and
the one or more distinguishable intrinsic noise sources comprise the one or more high frequency signatures.

11. The method of claim 10, wherein:
using the frequency domain data to identify one or more high frequency signatures comprises:
separating the frequency domain data into steady-state frequency domain data and transient frequency domain data;
identifying one or more high frequency steady-state signatures in the steady-state frequency domain data;
identifying one or more high frequency transient signatures in the transient frequency domain data; and
combining the one or more high frequency transient signatures and the one or more high frequency steady-state signatures into the one or more high frequency signatures.

12. The method of claim 1, wherein:
the predetermined period of the alternating current is sixty Hertz.

13. A method of compressing one or more first data signals, the method comprising:
using one or more first processors to determine a zero crossing of the one or more first data signals, the one or more first data signals comprising an alternating current with a predetermined period and one or more distinguishable intrinsic noise sources superimposed on the alternating current, the one or more distinguishable intrinsic noise sources produced by one or more electrical devices;
using the one or more first processors to determine a period of the one or more first data signals;
sampling the one or more first data signals at a predetermined delay from the zero crossing of the one or more first data signals to create two or more cyclostationary signals, the two or more cyclostationary signals are cyclostationary with the one or more first data signals;
using the one or more first processors to convert the two or more cyclostationary signals into frequency domain data; and
using the one or more first processors to apply a first compression algorithm to the frequency domain data to create compressed frequency domain data, wherein:
the one or more distinguishable intrinsic noise sources are produced by the one or more electrical devices during a transition of an electrical power state of at least a first one of the one or more electrical devices; and
the transition of the electrical power state of at least the first one of the one or more electrical devices comprises at least one of (1) a turning on of at least the first one of the one or more electrical devices, (2) a turning off of at least the first one of the one or more electrical devices, or (3) a varying of an amount of power consumed by at least the first one of the one or more electrical devices.

14. The method of claim 13, wherein:
using the one or more first processors to convert the two or more cyclostationary signals comprises:
performing a fast Fourier transform to the two or more cyclostationary signals to create two or more traces.

15. The method of claim 13, further comprising:
after using the one or more first processors to apply the first compression algorithm, transmitting the compressed frequency domain data from a first electrical device to a second electrical device; and
using the second electrical device to apply a first decompression algorithm to the compressed frequency domain data to decompress the compressed frequency domain data,
wherein:
the first electrical device comprises the one or more first processors.

16. The method of claim 13, wherein:
the first compression algorithm comprises a JPEG 2000 compression algorithm.

17. An apparatus configured to detect a change in an electrical power state of one or more electrical devices, the one or more electrical devices are coupled to an electrical power infrastructure carrying an alternating current and generate distinguishable intrinsic noise on the electrical power infrastructure such that the distinguishable intrinsic noise is superimposed on the alternating current, the apparatus comprises:
a data acquisition device comprising at least one first processor and configured to acquire first data about the distinguishable intrinsic noise and the alternating current on the electrical power infrastructure such that the acquiring of the first data is synchronized with a predetermined period of the alternating current;
a processing module configured to run on at least one first processor of the data acquisition device and configured to use the first data to create frequency domain data; and
a feature extraction module configured to run on the at least one first processor of the data acquisition device and further configured to apply a feature extraction algorithm to the frequency domain data to determine a transition of an electrical power state of at least a first one of the one or more electrical devices,
wherein:
the transition of the electrical power state of at least the first one of the one or more electrical devices comprises at least one of (1) a turning on of at least the first one of the one or more electrical devices, (2) a turning off of at least the first one of the one or more electrical devices, or (3) a varying of an amount of power consumed by at least the first one of the one or more electrical devices.

18. The apparatus of claim 17, further comprising:
a transition module configured to run on at least one of the at least one first processor of the data acquisition device or a second processor,
wherein:
the transition module is further configured to use the transition of the electrical power state of at least the first one of the one or more electrical devices to determine a first electrical power usage by at least the first one of the one or more electrical devices; and
the second processor is part of a data processing device.

19. The apparatus of claim 17, further comprising:
a transition module configured to run on at least one of the at least one first processor of the data acquisition device or a second processor,
wherein:
the transition module is further configured to use the frequency domain data to determine a first electrical power usage by at least the first one of the one or more electrical devices; and
the second processor is part of a data processing device.

20. The apparatus of claim 17, further comprising:
a compression module configured to run on the at least one first processor of the data acquisition device and further configured to apply a first compression algorithm to the frequency domain data to create compressed frequency domain data;
a remote data processing module configured to run on a second processor and further configured to apply a first decompression algorithm to the compressed frequency domain data to decompress the compressed frequency domain data; and
a communications module configured to transmit the compressed frequency domain data to the remote data processing module.

21. The method of claim 1, wherein:
at least the first one of the one or more electrical devices comprises at least one of an electric motor, a switched-mode power supply, or an inductive electrical device.

22. The apparatus of claim 17, wherein:
at least the first one of the one or more electrical devices comprises at least one of an electric motor, a switched-mode power supply, or an inductive electrical device.

* * * * *